United States Patent
Seok et al.

(10) Patent No.: US 12,395,993 B2
(45) Date of Patent: Aug. 19, 2025

(54) METHOD AND DEVICE FOR TRANSMITTING SIGNALS IN WIRELESS COMMUNICATION SYSTEM

(71) Applicant: WILUS INSTITUTE OF STANDARDS AND TECHNOLOGY INC., Gyeonggi-do (KR)

(72) Inventors: Geunyoung Seok, Gyeonggi-do (KR); Minseok Noh, Gyeonggi-do (KR); Youngjoon Yoon, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

(21) Appl. No.: 19/031,943

(22) Filed: Jan. 18, 2025

(65) Prior Publication Data

US 2025/0168854 A1 May 22, 2025

Related U.S. Application Data

(63) Continuation of application No. PCT/KR2023/010528, filed on Jul. 20, 2023.

(30) Foreign Application Priority Data

Jul. 20, 2022 (KR) .................. 10-2022-0089294
Sep. 27, 2022 (KR) .................. 10-2022-0122850

(51) Int. Cl.
*H04W 72/21* (2023.01)
*H04L 5/14* (2006.01)
*H04W 72/0453* (2023.01)

(52) U.S. Cl.
CPC .............. *H04W 72/21* (2023.01); *H04L 5/14* (2013.01); *H04W 72/0453* (2013.01)

(58) Field of Classification Search
CPC ............ H04W 72/21; H04W 72/0453; H04W 72/1289; H04L 5/14
See application file for complete search history.

(56) References Cited

U.S. PATENT DOCUMENTS 11,882,080 B2 * 1/2024 Ly ...................... H04L 5/1438
12,155,607 B2 * 11/2024 Abotabl .............. H04L 5/0012
(Continued)

FOREIGN PATENT DOCUMENTS

| KR | 10-2020-0110359 | 9/2020 |
| KR | 10-2022-0004773 | 1/2022 |

(Continued)

OTHER PUBLICATIONS

Wilus Inc. ("Discussion on subband non overlapping full duplex", 3GPP TSG RAN WG1 Meeting #109-e , R1-2204550, May 2022, 3 pages (Year: 2022).*

(Continued)

*Primary Examiner* — Brian T O Connor
(74) *Attorney, Agent, or Firm* — WOMBLE BOND DICKINSON (US) LLP

(57) ABSTRACT

The present invention relates to a wireless communication system, and specifically to: a method comprising the steps of receiving control information for transmitting a PUSCH, wherein the control information includes FDRA information, transmitting the PUSCH in a first RB set corresponding to a first hop within a UL BWP, wherein the first RB set is determined on the basis of the FDRA information, and transmitting the PUSCH in a second RB set corresponding to a second hop within the UL BWP, wherein the second RB set is adaptively determined on the basis of whether the (Continued)

second hop is in an SBFD slot in the time domain; and a wireless apparatus for same.

20 Claims, 25 Drawing Sheets

(56) References Cited

U.S. PATENT DOCUMENTS

| | | | |
|---|---|---|---|
| 2021/0007139 A1* | 1/2021 | Fu | H04L 41/0896 |
| 2022/0086827 A1 | 3/2022 | Chai et al. | |
| 2022/0086894 A1* | 3/2022 | Papasakellariou | H04W 72/23 |
| 2022/0159686 A1* | 5/2022 | Shin | H04L 5/0094 |
| 2023/0239122 A1 | 7/2023 | Abdelg et al. | |
| 2023/0283418 A1 | 9/2023 | Haffar et al. | |
| 2024/0048299 A1* | 2/2024 | Sridharan | H04W 72/0446 |
| 2025/0056506 A1* | 2/2025 | Shim | H04L 1/08 |

FOREIGN PATENT DOCUMENTS

| | | |
|---|---|---|
| WO | 2022/055333 | 3/2022 |
| WO | 2024/019569 | 1/2024 |

OTHER PUBLICATIONS

Wilus Inc. ("Discussion on subband non-overlapping full duplex", 3GPP TSG RAN WG1 Meeting #110 , R1-2207598, Aug. 2022, 5 pages (Year: 2022).*
InterDigital Inc. ("Discussion on SBFD operations for NR-duplex", 3GPP TSG RAN WG1 Meeting #110 , R1-2205937, Aug. 2022, 14 pages (Year: 2022).*
Samsung ("SBFD feasibility and design considerations for NR duplex evolution", 3GPP TSG RAN WG1 Meeting #110 , R1-2206421, Aug. 2022, 23 pages (Year: 2022).*
International Search Report for PCT/KR2023/010528 mailed on Oct. 24, 2023 and its English translation from WIPO (now published as WO2024/072191).
Written Opinion of the International Searching Authority for PCT/KR2023/010528 mailed on Oct. 24, 2023 and its English translation by Google Translate (now published as WO2024/072191).
3GPP TS 38.213 V17.2.0 (Jun. 2022): "3rd Generation Partnership Project; Technical Specification Group Radio Access Network; NR; Physical layer procedures for control (Release 17)", Jun. 23, 2022, pp. 1-256.

* cited by examiner

Fig. 22
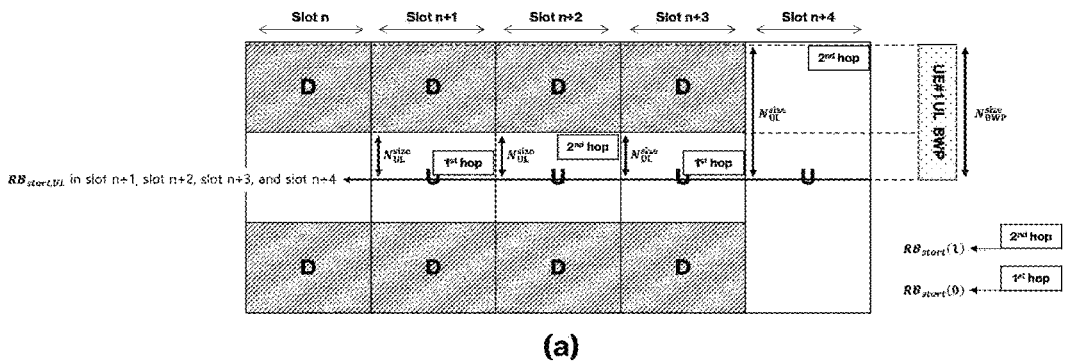
(a)
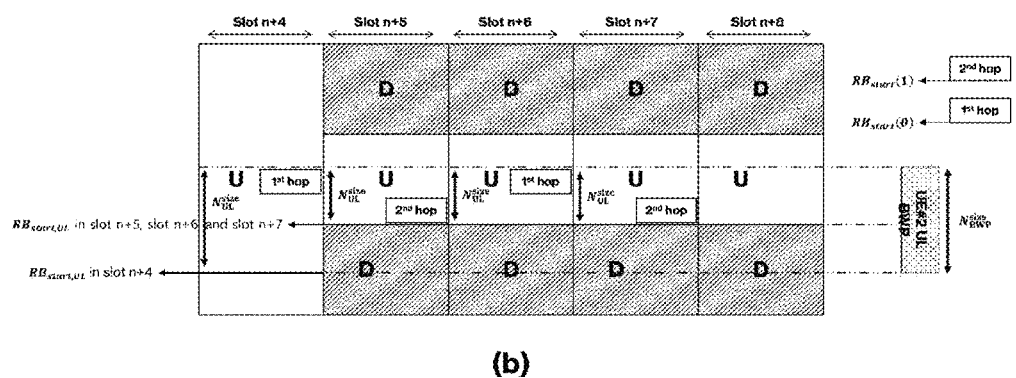
(b)
Fig. 23
First example
*PUCCH-Resource*
pucch-ResourceId = 0
startingPRB = 0
intraSlotFrequencyHopping = enabled
secondHopPRB = 20
secondHopPRB-r18 for SBFD = 10
format = format1
    format 1
      {
        initialCyclicShift 4,
        nrofSymbols 14,
        startingSymbolIndex 0,
        timeDomainOCC 0
      }

Fig. 24

Second Example
*PUCCH-Resource-r18 for SBFD* pucch-ResourceId = 0
startingPRB = 0
intraSlotFrequencyHopping = enabled
secondHopPRB = 10
format = format1
        format 1
          {
            initialCyclicShift 4,
            nrofSymbols 14,
            startingSymbolIndex 0,
            timeDomainOCC 0
          }

METHOD AND DEVICE FOR TRANSMITTING SIGNALS IN WIRELESS COMMUNICATION SYSTEM

TECHNICAL FIELD

The disclosure relates to a wireless communication system. Particularly, the disclosure relates to a method of transmitting a signal in a wireless communication system, and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE OF INVENTION

Technical Problem

The disclosure is to provide a method of efficiently transmitting a signal in a wireless communication system, and a device using the same. Particularly, the disclosure is to provide a frequency hopping method for efficiently performing transmission in a wireless communication system, and a device using the same.

Solution to Problem

One aspect of the disclosure provides a UE used in a wireless communication system, wherein the UE includes a communication module and a processor configured to control the communication module. The processor is configured to receive control information for transmitting a physical uplink shared channel (PUSCH), wherein the control information includes frequency domain resource assignment (FDRA) information, transmit the PUSCH in a first resource block (RB) set corresponding to a first hop in an uplink (UL) bandwidth part (BWP), wherein the first RB set is determined based on the FDRA information, and transmit the PUSCH in a second RB set corresponding to a second hop in the UL BWP, wherein when the second hop belongs to a subband non-overlapping full duplex (SBFD) symbol set in a time domain, the second RB set is determined based on a value satisfying Equation 1 below. Equation 1: M mod $N^{size}_{UL}$+$RB_{start,UL}$, wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $NN^{size}_{BWP}$ represents the number of RBs of the UL BWP, $N^{size}_{UL}$ represents the number of RBs of the UL subband in the SBFD symbol set, and $RB_{start,UL}$ represents an index of the RB having the lowest index among the RBs of the UL subband within the UL BWP in the SBFD symbol set.

One aspect of the disclosure provides a method used by a UE in a wireless communication system. The method includes receiving control information for transmitting a physical uplink shared channel (PUSCH), wherein the control information includes frequency domain resource assignment (FDRA) information, transmitting the PUSCH in a first resource block (RB) set corresponding to a first hop in an uplink (UL) bandwidth part (BWP), wherein the first RB set is determined based on the FDRA information, and transmitting the PUSCH in a second RB set corresponding to a second hop in the UL BWP, wherein when the second hop belongs to a subband non-overlapping full duplex (SBFD) symbol set in a time domain, the second RB set is determined based on a value satisfying Equation 1 below. Equation 1: M mod $N^{size}_{UL}$+$RB_{start,UL}$, wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of the UL subband in the SBFD symbol set, and $RB_{start,UL}$ represents an index of the RB having the lowest index among the RBs of the UL subband within the UL BWP in the SBFD symbol set.

One aspect of the disclosure provides a base station used in a wireless communication system, wherein the base station includes a communication module and a processor configured to control the communication module. The processor transmits control information for receiving a physical uplink shared channel (PUSCH), wherein the control information includes frequency domain resource assignment (FDRA) information, receives the PUSCH in a first resource block (RB) set corresponding to a first hop in an uplink (UL) bandwidth part (BWP), wherein the first RB set is determined based on the FDRA information, and receives the PUSCH in a second RB set corresponding to a second hop in the UL BWP, wherein when the second hop belongs to a subband non-overlapping full duplex (SBFD) symbol set in a time domain, the second RB set is determined based on a value satisfying Equation 1 below. Equation 1: M mod $N^{size}_{UL}$+$RB_{start,UL}$, wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of the UL subband in the SBFD symbol set, and $RB_{start,UL}$ represents an index of the RB having the lowest index among the RBs of the UL subband within the UL BWP in the SBFD symbol set.

One aspect of the disclosure provides a method used by a base station in a wireless communication system. The method includes transmitting control information for receiving a physical uplink shared channel (PUSCH), wherein the control information includes frequency domain resource assignment (FDRA) information, receiving the PUSCH in a first resource block (RB) set corresponding to a first hop in an uplink (UL) bandwidth part (BWP), wherein the first RB set is determined based on the FDRA information, and receiving the PUSCH in a second RB set corresponding to a second hop in the UL BWP, wherein when the second hop belongs to a subband non-overlapping full duplex (SBFD) symbol set in a time domain, the second RB set is determined based on a value satisfying Equation 1 below. Equation 1: M mod $N^{size}_{UL}$+$RB_{start,UL}$, wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of the UL subband in the SBFD symbol set, and $RB_{start,UL}$ represents an index of the RB having the lowest index among the RBs of the UL subband within the UL BWP in the SBFD symbol set.

Preferably, when the second hop belongs to a non-SBFD symbol set in the time domain, the second RB set may be determined based on a value satisfying Equation 2 below: Equation 2: ($RB_{start}$+$RB_{offset}$) mod $N^{size}_{BWP}$.

Preferably, M may include ($RB_{start}$+$RB_{offset}$−$RB_{start,UL}$).

Preferably, the SBFD symbol set may include the UL subband and a DL subband frequency-division multiplexed (FDMed) in a frequency domain, and an RB having a lowest index in the UL subband may be located within the UL BWP.

Preferably, the first RB set may be determined identically based on the FDRA information, regardless of whether the first hop belongs to the SBFD symbol set or the non-SBFD symbol set in the time domain.

Advantageous Effects of Invention

The disclosure provides a method of efficiently transmitting a signal in a wireless communication system, and a device using the same. In addition, the disclosure provides a frequency hopping method of efficiently performing transmission in a wireless communication system, and a device using the same.

The effects that can be obtained from the disclosure are not limited to the effects mentioned above, and other effects that are not mentioned will be clearly understood by those skilled in the art to which the disclosure belongs from the description below.

BRIEF DESCRIPTION OF DRAWINGS

FIGS. 21 to 29 illustrate a frequency hopping method in a resource configured or allocated for a subband according to an example of the disclosure.

BEST MODE FOR CARRYING OUT THE INVENTION

Figure 1:
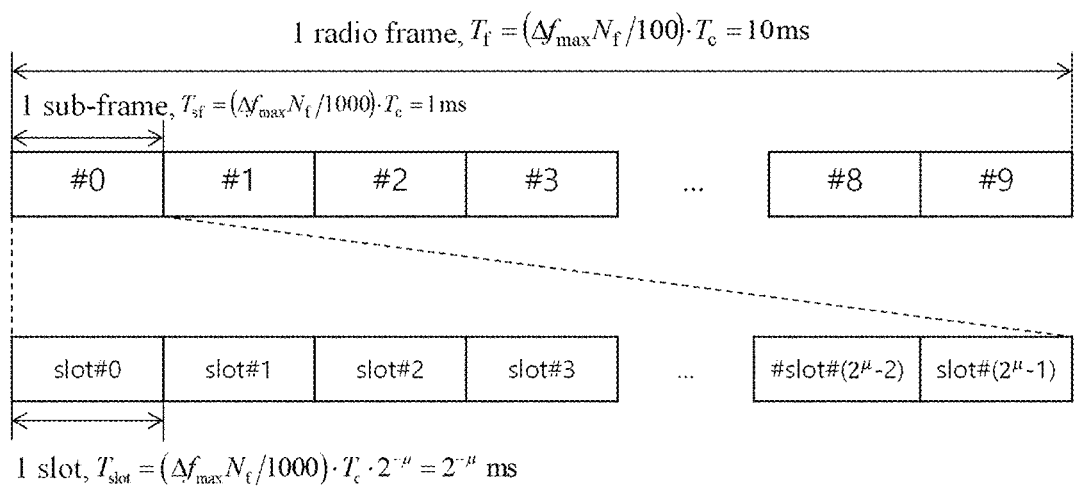
FIG. 1 illustrates an example of a wireless frame structure used in a wireless communication system.

Terms used in the specification adopt general terms which are currently widely used as possible by considering functions in the present disclosure, but the terms may be changed depending on an intention of those skilled in the art, customs, and emergence of new technology. Further, in a specific case, there is a term arbitrarily selected by an applicant and in this case, a meaning thereof will be described in a corresponding description part of the present disclosure. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present disclosure is not limited thereto.

Unless otherwise specified in this specification, a base station may refer to a next generation node B (gNB) as defined in 3GPP NR. Furthermore, unless otherwise specified, a terminal may refer to a user equipment (UE). Hereinafter, in order to facilitate understanding of the description, each content is separately divided into embodiments and described, but each of the embodiments may be used in combination with each other. In the present disclosure, the configuration of the UE may indicate configuration by the base station. Specifically, the base station may transmit a channel or signal to the UE to configure an operation of the UE or a parameter value used in a wireless communication system.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f / 100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one subframe. Each subframe has a length of 1 ms and may include one or more slots according to a subcarrier spacing. More specifically, in the 3GPP NR system, the subcarrier spacing that may be used is $15*2^\mu$ kHz, and can have a value of $\mu=0$, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe number), and a slot number (or a slot index).

Figure 2:
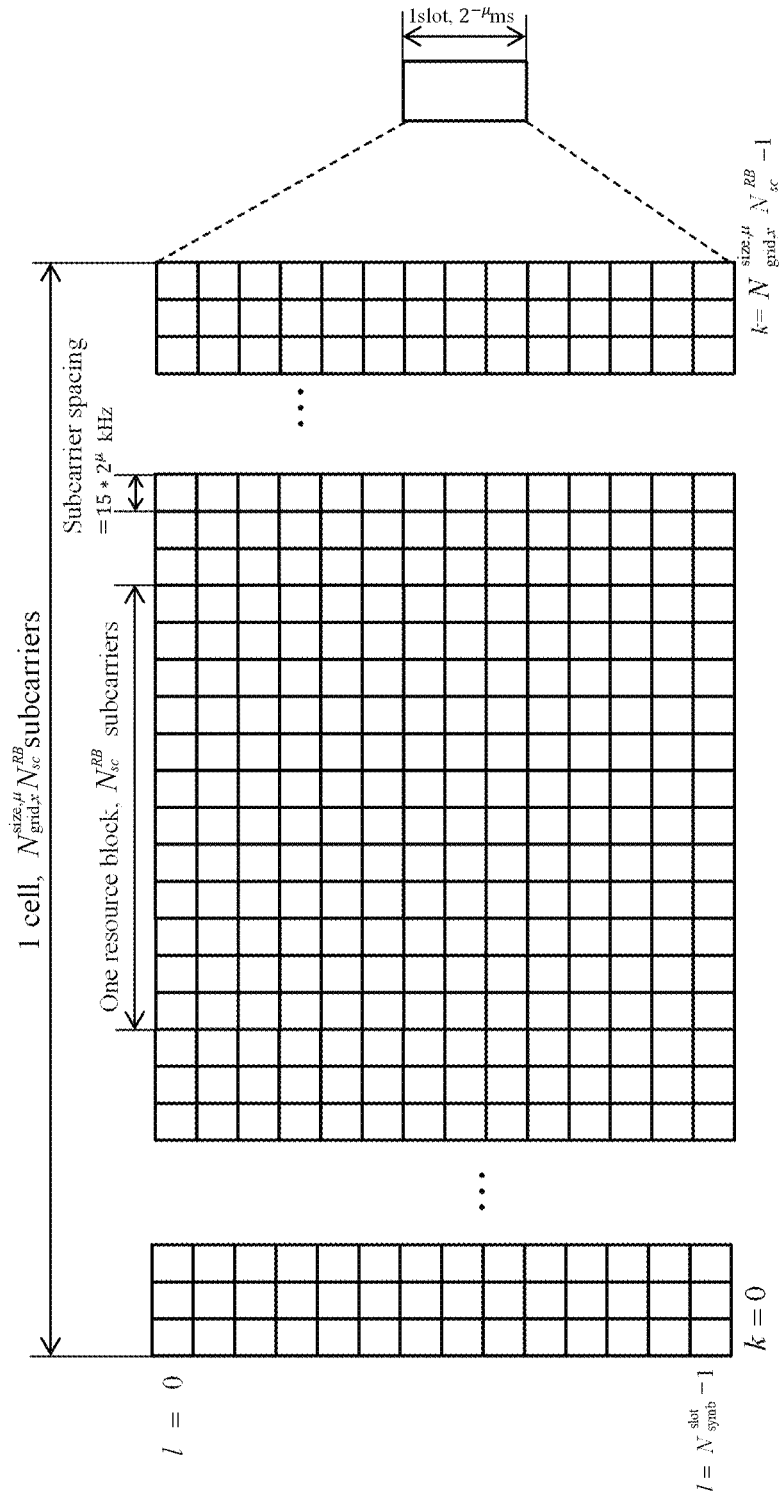
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent $\mu$ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP- OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x} * N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb} * N^{RB}_{sc}$ resource elements. Each resource element in the resource grid can be uniquely defined by a pair of indexes (k, l) in one slot. k may be an index assigned from 0 to $N^{size,\mu}_{grid, x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is impossible. In the UL symbol, UL transmission is possible, but DL transmission is impossible. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
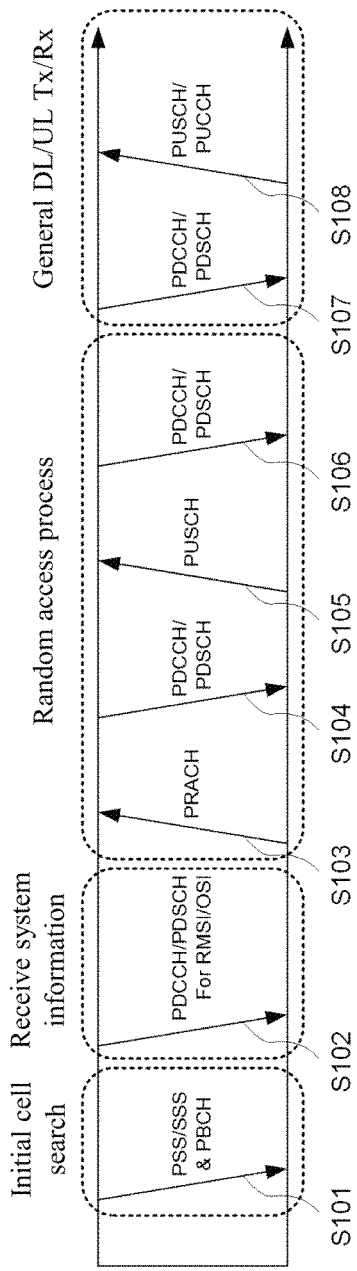
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Here, the system information received by the UE is cell-common system information for the UE to properly operate at the physical layer in Radio Resource Control (RRC), and is referred to as remaining system information (RSMI) or system information block (SIB) 1.

When the UE initially accesses the base station or does not have radio resources for signal transmission (when the UE is in RRC_IDLE mode), the UE may perform a random access procedure on the base station (operations S103 to S106). First, the UE may transmit a preamble through a physical random access channel (PRACH) (S103), and receive a response message for the preamble from the base station through the PDCCH and the corresponding PDSCH (S104). When a valid random access response is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. During the random access process, the UE may obtain UE-specific system information necessary for the UE to properly operate at the physical layer in the RRC layer. When the UE obtains UE-specific system information from the RRC layer, the UE enters the RRC_CONNECTED mode.

The RRC layer is used for message generation and management for control between a UE and a radio access network (RAN). More specifically, in the RRC layer, the base station and the UE may perform broadcasting of cell system information, delivery management of paging messages, mobility management and handover, measurement report and control thereof, UE capability management, and storage management including existing management necessary for all UEs in the cell. In general, since the update of the signal (hereinafter, referred to as RRC signal) transmitted from the RRC layer is longer than the transmission/reception period (i.e., transmission time interval, TTI) in the physical layer, the RRC signal may be maintained unchanged for a long period.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4A:
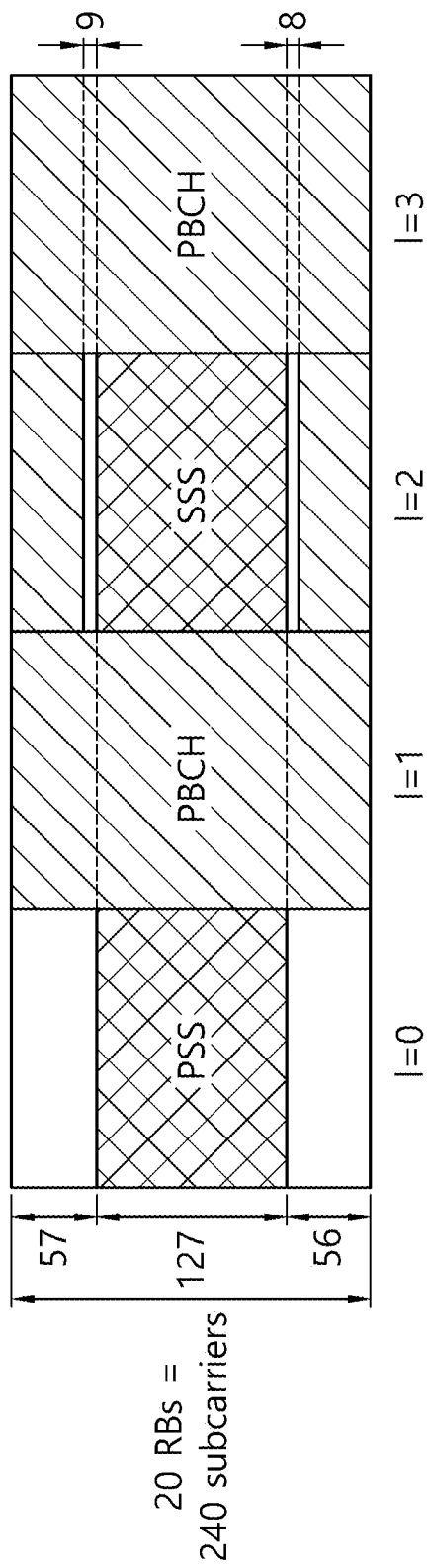
FIGS. 4a and 4b illustrate an SS/PBCH block for initial cell access in a 3GPP NR system.
Figure 4B:
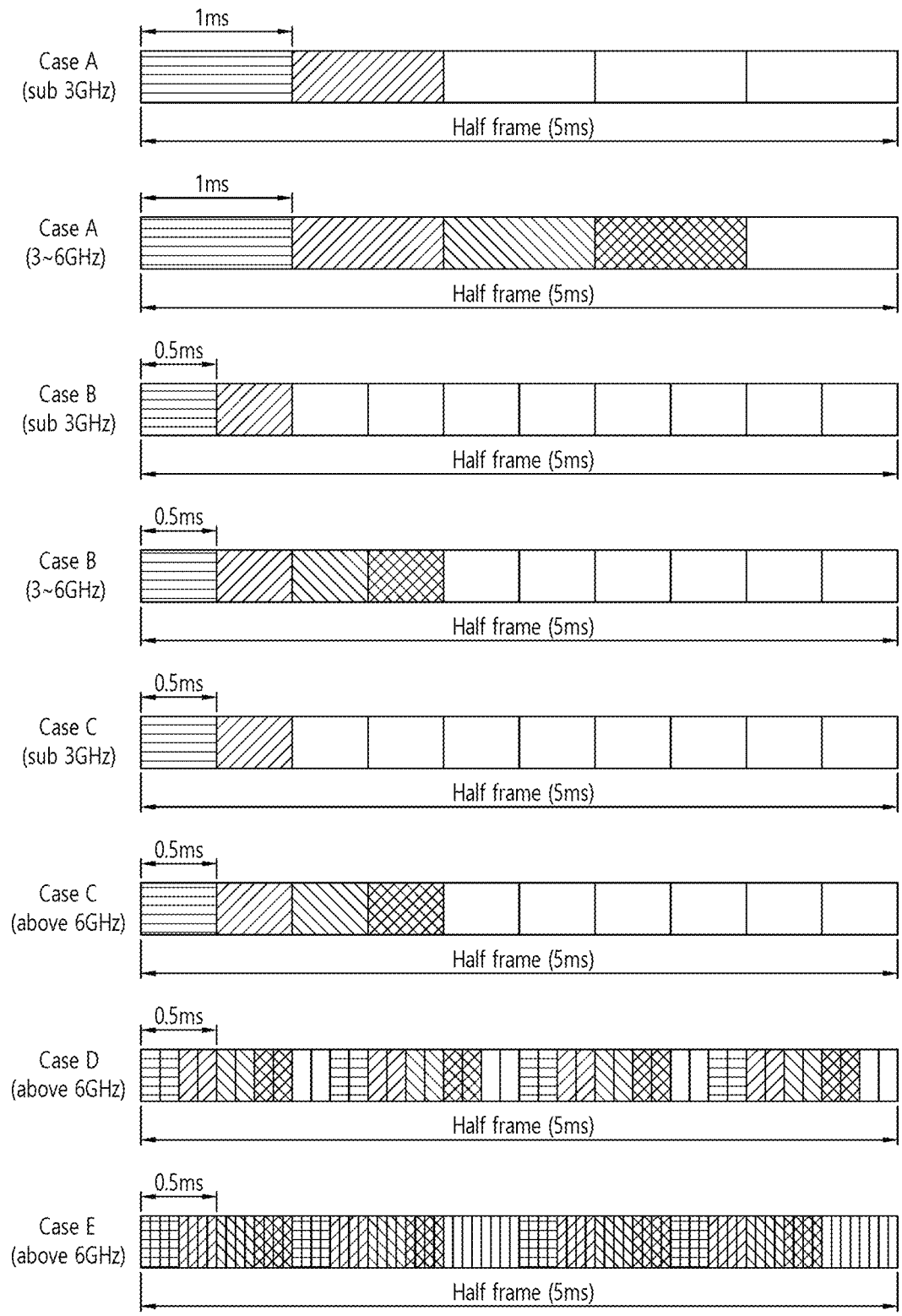

FIGS. 4a and 4b illustrate an SS/PBCH block for initial cell access in a 3GPP NR system.

When the power is turned on or wanting to access a new cell, the UE may obtain time and frequency synchronization with the cell and perform an initial cell search procedure. The UE may detect a physical cell identity NcellID of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4a, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4a and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number/ relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n) = 1 - 2x(m)$$

$$m = (n + 43N^{(2)}_{ID}) \bmod 27$$

$$0 \leq n < 127$$

$$x(i+7) = (x(i+4) + x(i)) \bmod 2$$

Here, $x(i+7)=(x(i+4)+x(i))$ mod 2 and is given as, $$[x(6)\ x(5)\ x(4)\ x(3)\ x(2)\ x(1)\ x(0)] = [1\ 1\ 1\ 0\ 1\ 1\ 0]$$

Further, the sequence $d_{SSS}(n)$ of the SSS is as follows.

$$d_{SSS}(n) = [1 - 2x_0((n+m_0) \bmod 127)][1 - 2x_1((n+m_1) \bmod 127)]$$

$$m_0 = 15 \left\lfloor \frac{N^{(1)}_{ID}}{112} \right\rfloor + 5N^{(2)}_{ID}$$

$$m_1 = N^{(1)}_{ID} \bmod 112$$

$$0 \leq n < 127$$

$$x_0(i+7) = (x_0(i+4) + x_0(i)) \bmod 2$$

Here, $x_1(i+7)=(x_1(i+1)+x_1(i))$ mod 2 and is given as, $$[x_0(6)\ x_0(5)\ x_0(4)\ x_0(3)\ x_0(2)\ x_0(1)\ x_0(0)] = [0\ 0\ 0\ 0\ 0\ 0\ 1]$$

$$[x_1(6)\ x_1(5)\ x_1(4)\ x_1(3)\ x_1(2)\ x_1(1)\ x_1(0)] = [0\ 0\ 0\ 0\ 0\ 0\ 1]$$

A radio frame with a 10 ms length may be divided into two half frames with a 5 ms length. Referring to FIG. 4b, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5A:
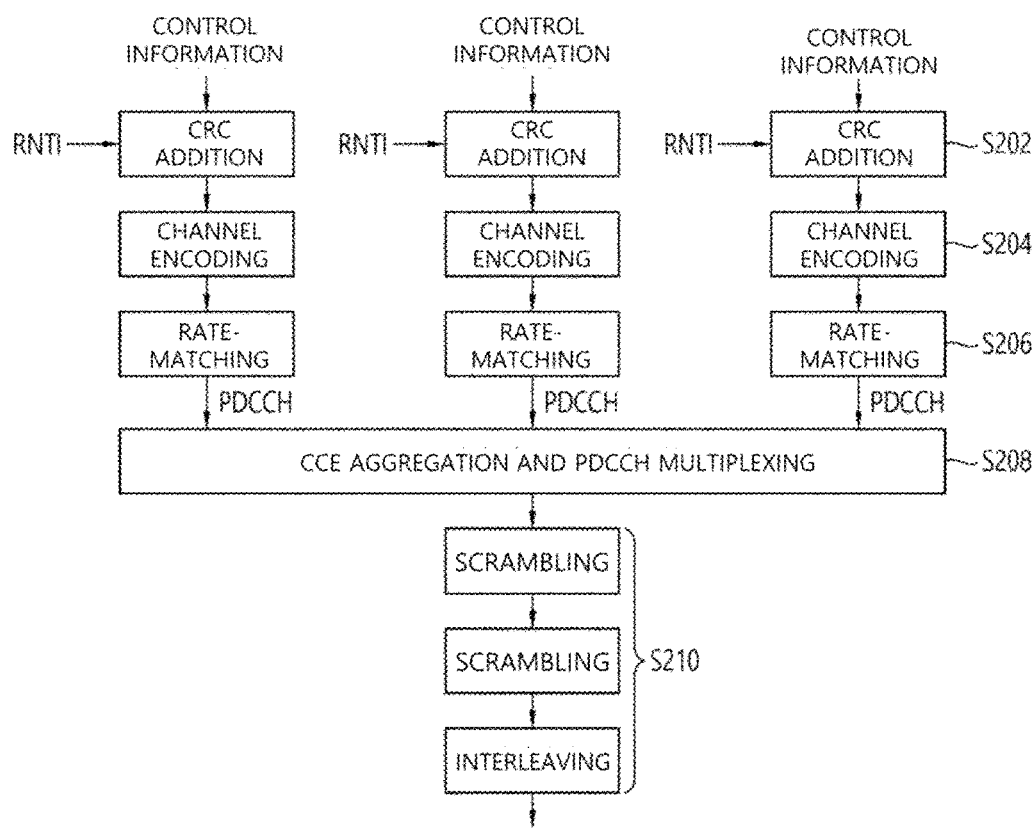
FIG. 5a and FIG. 5b illustrate a procedure for transmitting control information and a control channel in a 3GPP NR system.
Figure 5B:
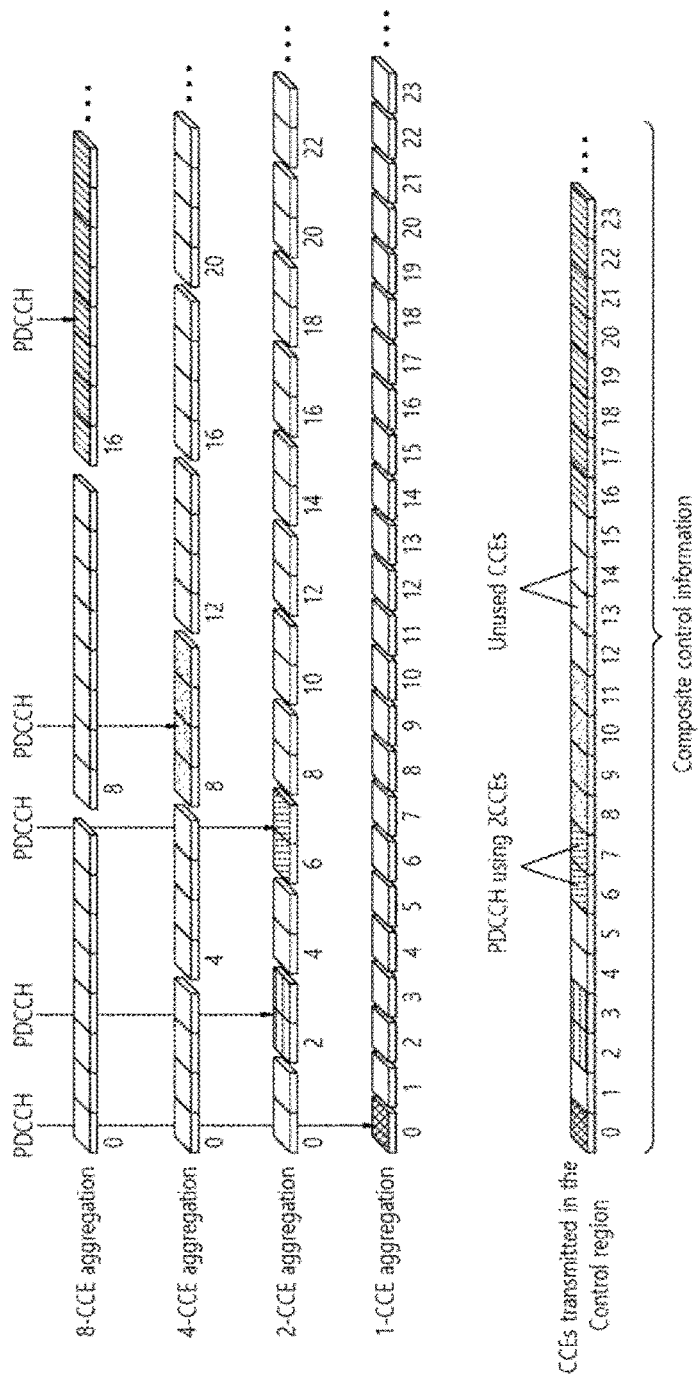

FIGS. 5a and 5b illustrate a procedure for transmitting control information and a control channel in a 3GPP NR system. Referring to FIG. 5a, the base station may add a cyclic redundancy check (CRC) masked (e.g., an XOR operation) with a radio network temporary identifier (RNTI) to control information (e.g., downlink control information (DCI)) (S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5b is a diagram related to a CCE aggregation level and the multiplexing of a PDCCH and illustrates the type of a CCE aggregation level used for one PDCCH and CCE(s) transmitted in the control area according thereto.

Figure 6:
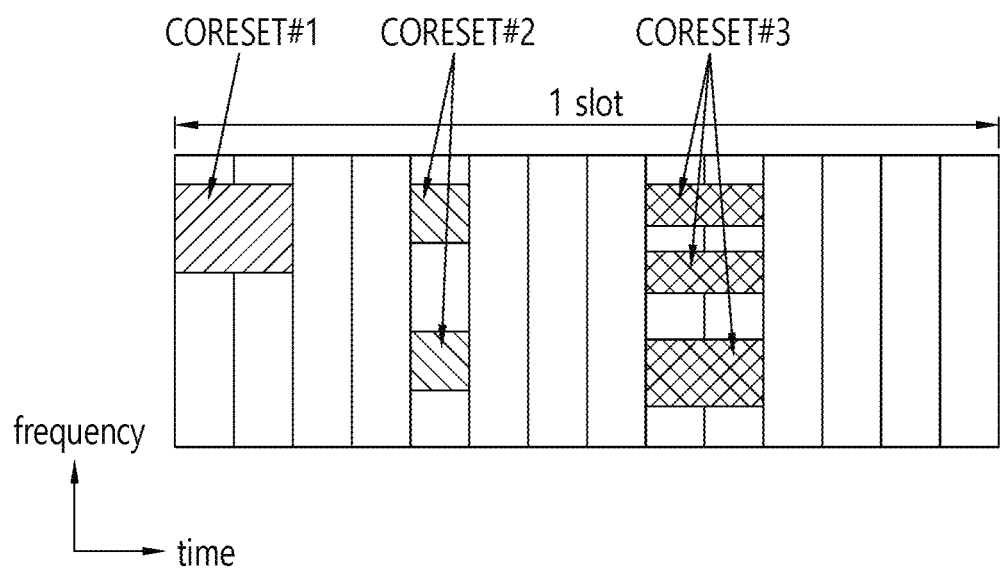
FIG. 6 illustrates a control resource set (CORESET) in which a physical downlink control channel (PDCCH) may be transmitted in a 3GPP NR system.

FIG. 6 illustrates a control resource set (CORESET) in which a physical downlink control channel (PDCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 6, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
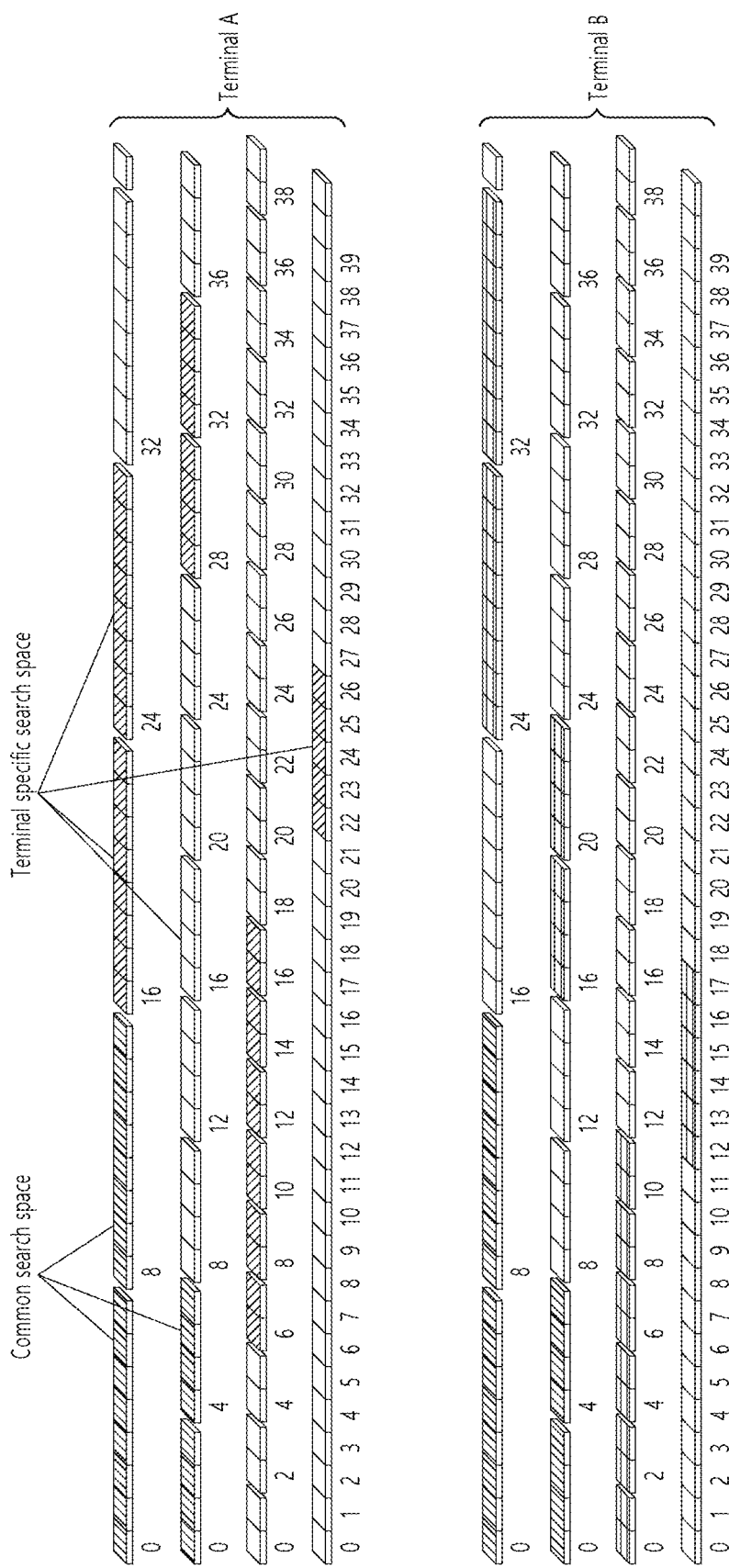
FIG. 7 illustrates a method for configuring a PDCCH search space in a 3GPP NR system.

FIG. 7 illustrates a method for setting a PDCCH search space in a 3GPP NR system.

In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a Terminal-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH.

For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
|---|---|---|
| 0 | 1-2 | ≤2 |
| 1 | 4-14 | ≤2 |
| 2 | 1-2 | >2 |
| 3 | 4-14 | >2 |
| 4 | 4-14 | >2 |

PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of transmitting 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence to the two symbols may be transmitted through different RBs. In this case, the sequence may be a cyclic shift (CS) sequence from the base sequence used for PUCCH format 0. Through this, the UE can obtain a frequency diversity gain. Specifically, the UE may determine a cyclic shift (CS) value $m_{cs}$ according to the $M_{bit}$ bit UCI ($M_{bit}$=1 or 2). In addition, a sequence in which a base sequence of length 12 is cyclically shifted based on a predetermined CS value $m_{cs}$ may be mapped to 1 OFDM symbol and 12 REs of 1 RB and transmitted. When the number of cyclic shifts available to the UE is 12 and $M_{bit}$=1, 1 bit UCI 0 and 1 may be mapped to two cyclic shifted sequences having a difference of 6 cyclic shift values, respectively. In addition, when $M_{bit}$=2, 2 bits UCI 00, 01, 11, and 10 may be mapped to four cyclic shifted sequences in which the difference in cyclic shift values is 3, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}$=1, may be BPSK-modulated. The UE may modulate UCI, which is $M_{bit}$=2, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), ..., d($M_{symbol}$−1). Here, $M_{symbol}$ may be $M_{bit}$/2. Through this, the UE may obtain a frequency diversity gain. More specifically, $M_{bit}$ bit UCI ($M_{bit}$>2) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI (Mbit>2) with π/2-Binary Phase Shift Keying (BPSK) or QPSK to generate a complex valued symbol d(0) to d($M_{symb}$−1). Here, when using π/2-BPSK, $M_{symb}$=$M_{bit}$, and when using QPSK, $M_{symb}$=$M_{bit}$/2. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, the UE may perform transmission/reception using a bandwidth less than or equal to the bandwidth of the carrier (or cell). To this end, the UE may be configured with a bandwidth part (BWP) consisting of a continuous bandwidth of a portion of the bandwidth of the carrier. A UE operating according to TDD or operating in an unpaired spectrum may receive up to four DL/UL BWP pairs for one carrier (or cell). In addition, the UE may activate one DL/UL BWP pair. A UE operating according to FDD or operating in a paired spectrum may receive up to 4 DL BWPs on a downlink carrier (or cell) and up to 4 UL BWPs on an uplink carrier (or cell). The UE may activate one DL BWP and UL BWP for each carrier (or cell). The UE may not receive or transmit in time-frequency resources other than the activated BWP. The activated BWP may be referred to as an active BWP.

The base station may indicate an activated BWP among the BWPs configured by the UE through downlink control information (DCI). The BWP indicated through DCI is activated, and other configured BWP(s) are deactivated. In a carrier (or cell) operating in TDD, the base station may include a bandwidth part indicator (BPI) indicating the BWP activated in the DCI scheduling the PDSCH or PUSCH to change the DL/UL BWP pair of the UE. The UE may receive a DCI scheduling a PDSCH or a PUSCH and may identify a DL/UL BWP pair activated based on the BPI. In the case of a downlink carrier (or cell) operating in FDD, the base station may include a BPI indicating the activated BWP in the DCI scheduling the PDSCH to change the DL BWP of the UE. In the case of an uplink carrier (or cell) operating in FDD, the base station may include a BPI indicating the activated BWP in the DCI scheduling the PUSCH to change the UL BWP of the UE.

Figure 8:
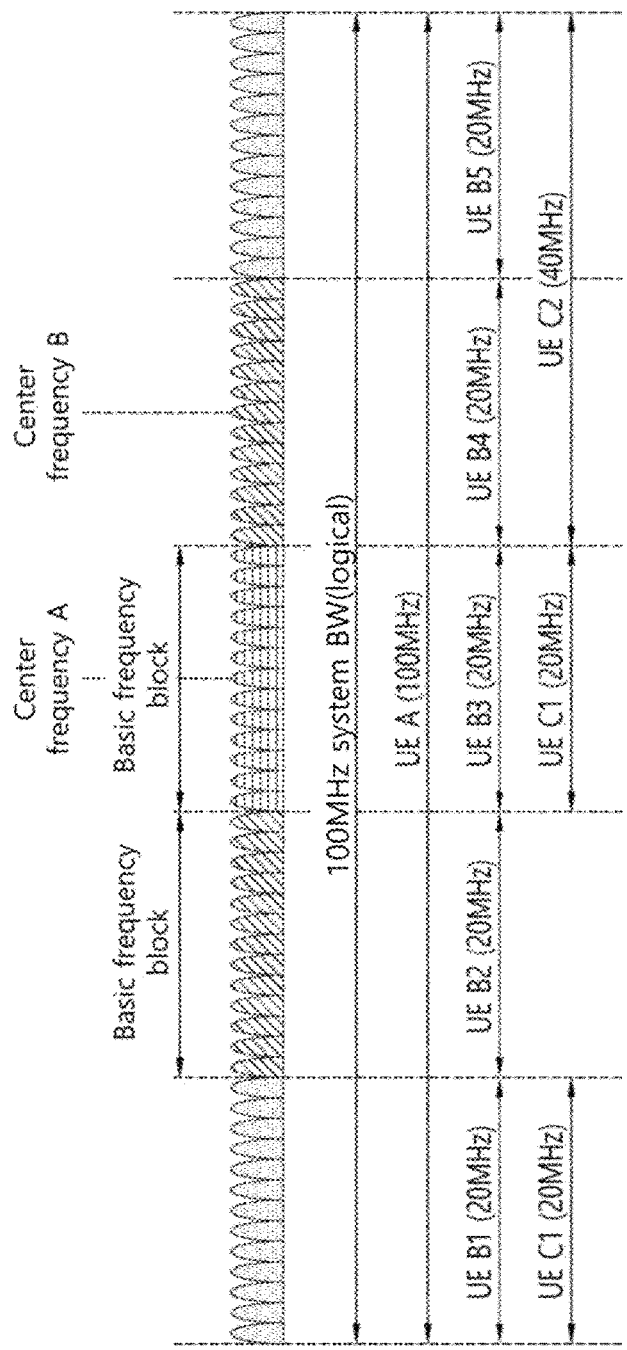
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
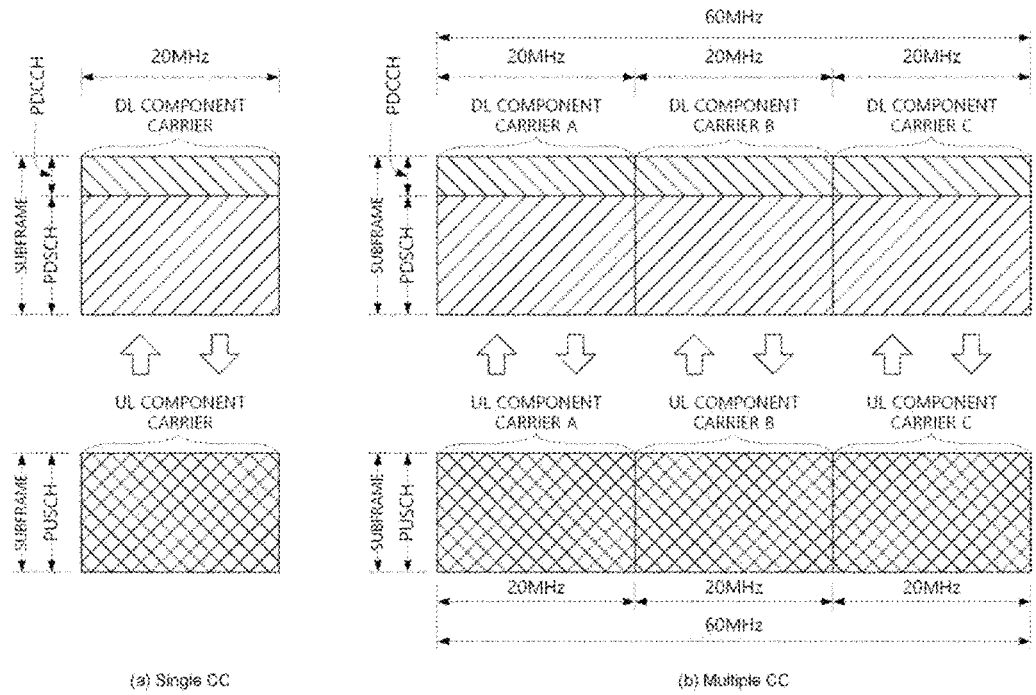
FIG. 9 is a diagram for explaining signal carrier communication and multiple carrier communication.

FIG. 9 is a drawing for explaining signal carrier communication and multiple carrier communication. Particularly, FIG. 9(*a*) shows a single carrier subframe structure and FIG. 9(*b*) shows a multi-carrier subframe structure.

Referring to FIG. 9(*a*), in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9(*b*), three 20 MHz component carriers (CCs) can be aggregated into each of UL and DL, so that a bandwidth of 60 MHz can be supported. Each CC may be adjacent or non-adjacent to one another in the frequency domain. FIG. 9(*b*) shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PS-cell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
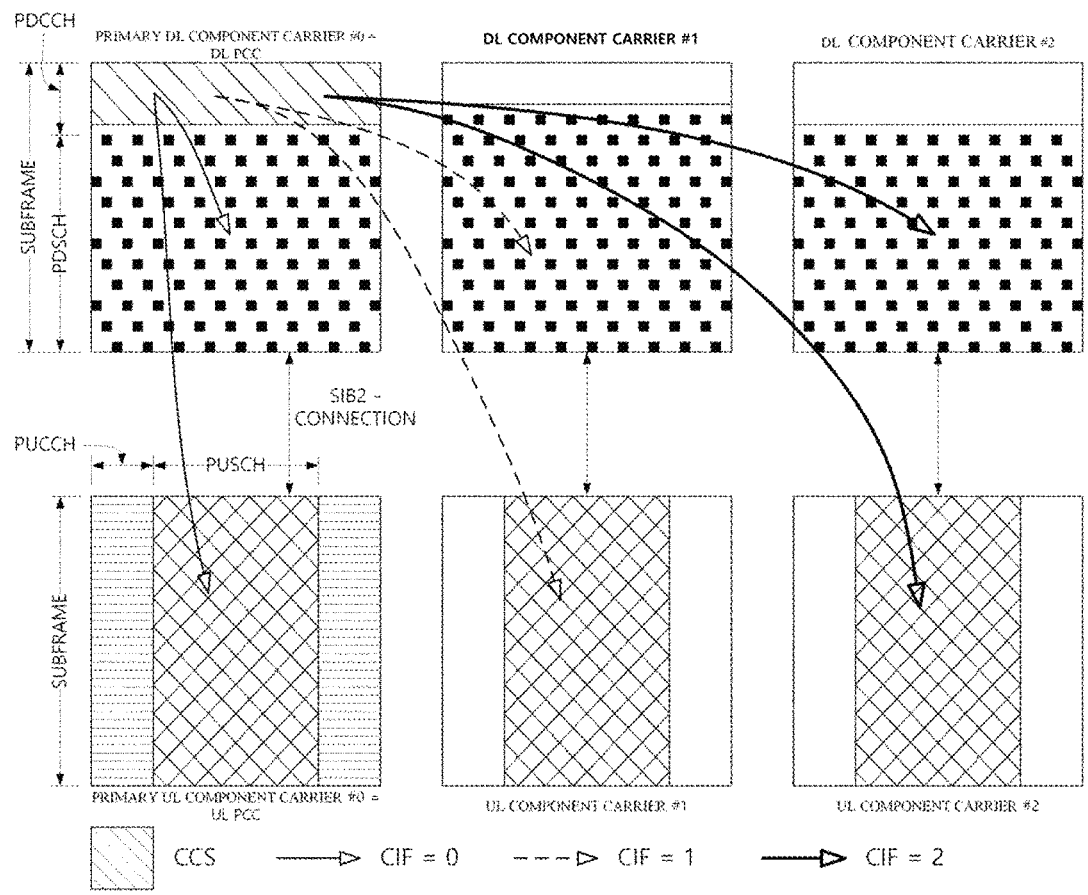
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
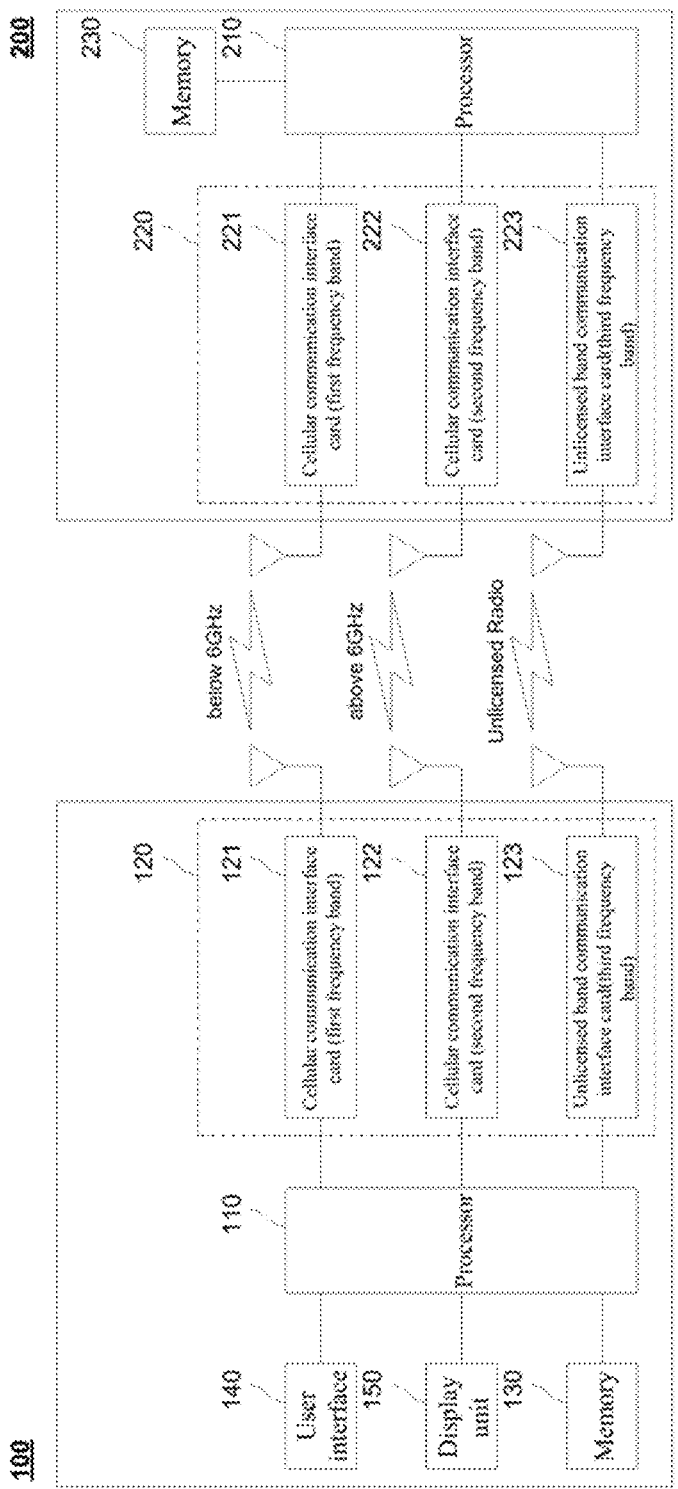
FIG. 11 is a block diagram showing the configurations of a UE and a base station according to an embodiment of the present disclosure.

FIG. 11 is a block diagram showing the configurations of a UE and a base station according to an embodiment of the present disclosure.

In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 220 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the UE 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the UE 100, an external device, and a server in accordance with the cellular communication standards or protocols in the frequency bands less than 6 GHz supported by the corresponding NIC module.

The cellular communication interface card 222 may transmit or receive a radio signal with at least one of the UE 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz, 5 GHz, 6 GHz, 7 GHz, or above 52.6 GHz. At least one NIC module of the unlicensed band communication interface card 223 may independently or dependently perform wireless communication with at least one of the UE 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

A slot format may be configured for the UE by the base station in a TDD or unpaired spectrum system. The slot format may refer to the type of symbols in the slot. The symbol type may be at least one of a downlink symbol (DL symbol), an uplink symbol (UL symbol), or a flexible symbol. A symbol type of a slot in a radio frame may be configured for the UE by the base station. The flexible symbol may refer to a symbol that is not configured as a downlink symbol or an uplink symbol.

The UE may receive information about the type of each symbol in the slot from the base station through a cell-specific or cell-common radio resource control (RRC) signal. Alternatively, the UE may semi-statically receive information about the type of each symbol in the slot via SIB1. Furthermore, the UE may semi-statically receive information about the type of each symbol in the slot from the base station through a UE-specific UE-dedicated RRC signal. The base station may configure/set the type of each symbol in the slot for the UE by using the information about the type of each symbol in the slot.

When the UE receives the information about the type of each symbol in the slot from the base station through a cell-specific RRC signal, the information about the type of each symbol may include at least one among the period of a cell-specific slot, the number of slots including only downlink symbols starting from a cell-specific slot at which the period begins, the number of downlink symbols starting from the first symbol of a slot immediately following the last slot including only downlink symbols, the number of slots including only uplink symbols starting from the last cell-specific slot of the period, and the number of uplink symbols immediately preceding the last of slots including only uplink symbols. Furthermore, when the UE receives the information about the type of each symbol in the slot from the base station through a cell-specific RRC signal, the information about the type of each symbol may include up to two slot patterns. In this case, each of the two patterns may be applied consecutively to symbols in the time domain. The downlink symbol, the uplink symbol, and the flexible symbol configured based on the cell-specific RRC signal or SIB1 may be referred to as a cell-specific downlink symbol, a cell-specific uplink symbol, and a cell-specific flexible symbol, respectively.

When the UE receives information about the type of each symbol in the slot from the base station through a UE-specific RRC signal, the cell-specific flexible symbol may be configured as a downlink symbol or an uplink symbol. In this case, the information about the type of each symbol may include at least one among an index for a slot in a period, the number of downlink symbols starting from the first symbol in a slot indicated by the index, and the number of uplink symbols starting from the last symbol in the slot indicated by the index. In addition, for the UE, all of the symbols in the slot are configured as downlink symbols, or all of the symbols in the slot are configured as uplink symbols. The downlink symbol, the uplink symbol, and the flexible symbol configured based on the UE-specific RRC signal may be referred to as a UE-specific downlink symbol, a UE-specific uplink symbol, and a UE-specific flexible symbol, respectively.

The base station may transmit information about the slot format to the UE via a slot format indicator (SFI) in DCI format 2_0 contained in a group common (GC)-PDCCH. The GC-PDCCH may be CRC-scrambled with SFI-RNTI for UEs receiving the information about the slot format. Hereinafter, an SFI transmitted via a GC-PDCCH may be described as a dynamic SFI.

The UE may receive a dynamic SFI through GC-PDCCH to receive indication of whether symbols in a slot are cell-specific flexible symbols or UE-specific flexible symbols, downlink symbols, uplink symbols, or flexible symbols. In other words, only a flexible symbol semi-statically configured for the UE may be indicated as one of a downlink symbol, an uplink symbol, and a flexible symbol via a dynamic SFI. The UE may not expect that a semi-statically configured downlink symbol or uplink symbol will be indicated as a different type of symbol by the dynamic SFI. The UE may perform blind decoding at each monitoring period configured by the base station to receive a GC-PDCCH transmitting DCI format 2_0 including the dynamic SFI. When the UE successfully receives the GC-PDCCH by performing the blind decoding, the UE may apply information about a slot format indicated by the dynamic SFI, starting from a slot in which the GC-PDCCH has been received.

A combination of slot formats that can be indicated through a dynamic SFI may be configured for the UE by the base station. The slot format combination may be for each of 1 to 256 slots, and a slot format combination for one of the 1 to 256 slots may be configured for the UE through a dynamic SFI. The dynamic SFI may include an index indicating a slot to which the slot format combination is applied. Table 3 shows a slot format combination for each slot (see 3GPP TS38.213).

TABLE 3

| Format | Symbol number in a slot | | | | | | | | | | | | | |
|---|---|---|---|---|---|---|---|---|---|---|---|---|---|---|
| | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| 5 | D | D | D | D | D | D | D | D | D | D | D | F | F | F |
| 6 | D | D | D | D | D | D | D | D | D | D | F | F | F | F |
| 7 | D | D | D | D | D | D | D | D | F | F | F | F | F | F |
| 8 | F | F | F | F | F | F | F | F | F | F | F | F | F | U |
| 9 | F | F | F | F | F | F | F | F | F | F | F | F | U | U |
| 10 | F | U | U | U | U | U | U | U | U | U | U | U | U | U |
| 11 | F | F | U | U | U | U | U | U | U | U | U | U | U | U |
| 12 | F | F | F | U | U | U | U | U | U | U | U | U | U | U |
| 13 | F | F | F | F | U | U | U | U | U | U | U | U | U | U |
| 14 | F | F | F | F | F | U | U | U | U | U | U | U | U | U |
| 15 | F | F | F | F | F | F | U | U | U | U | U | U | U | U |
| 16 | D | F | F | F | F | F | F | F | F | F | F | F | F | F |
| 17 | D | D | F | F | F | F | F | F | F | F | F | F | F | F |
| 18 | D | D | D | F | F | F | F | F | F | F | F | F | F | F |
| 19 | D | F | F | F | F | F | F | F | F | F | F | F | F | U |
| 20 | D | D | F | F | F | F | F | F | F | F | F | F | F | U |
| 21 | D | D | D | F | F | F | F | F | F | F | F | F | F | U |
| 22 | D | F | F | F | F | F | F | F | F | F | F | F | U | U |
| 23 | D | D | F | F | F | F | F | F | F | F | F | F | U | U |
| 24 | D | D | D | F | F | F | F | F | F | F | F | F | U | U |
| 25 | D | F | F | F | F | F | F | F | F | F | U | U | U | U |
| 26 | D | D | F | F | F | F | F | F | F | F | U | U | U | U |
| 27 | D | D | D | F | F | F | F | F | F | F | U | U | U | U |
| 28 | D | D | D | D | D | D | D | D | D | D | D | F | F | U |
| 29 | D | D | D | D | D | D | D | D | D | D | F | F | F | U |
| 30 | D | D | D | D | D | D | D | D | D | F | F | F | F | U |
| 31 | D | D | D | D | D | D | D | D | D | D | F | F | U | U |
| 32 | D | D | D | D | D | D | D | D | D | F | F | F | U | U |
| 33 | D | D | D | D | D | D | D | D | F | F | F | F | U | U |
| 34 | D | F | U | U | U | U | U | U | U | U | U | U | U | U |
| 35 | D | D | F | U | U | U | U | U | U | U | U | U | U | U |
| 36 | D | D | D | F | U | U | U | U | U | U | U | U | U | U |
| 37 | D | F | F | U | U | U | U | U | U | U | U | U | U | U |
| 38 | D | D | F | F | U | U | U | U | U | U | U | U | U | U |
| 39 | D | D | D | F | F | U | U | U | U | U | U | U | U | U |
| 40 | D | F | F | F | U | U | U | U | U | U | U | U | U | U |

TABLE 3-continued

| | Symbol number in a slot | | | | | | | | | | | | | |
|---|---|---|---|---|---|---|---|---|---|---|---|---|---|---|
| Format | 0 | 1 | 2 | 3 | 4 | 5 | 6 | 7 | 8 | 9 | 10 | 11 | 12 | 13 |
| 41 | D | D | F | F | F | U | U | U | U | U | U | U | U | U |
| 42 | D | D | D | F | F | F | U | U | U | U | U | U | U | U |
| 43 | D | D | D | D | D | D | D | D | D | F | F | F | F | U |
| 44 | D | D | D | D | D | D | F | F | F | F | F | F | U | U |
| 45 | D | D | D | D | D | D | F | F | U | U | U | U | U | U |
| 46 | D | D | D | D | F | U | D | D | D | D | D | D | F | U |
| 47 | D | D | F | U | U | U | U | D | D | F | U | U | U | U |
| 48 | D | F | U | U | U | U | U | D | F | U | U | U | U | U |
| 49 | D | D | D | F | F | U | U | D | D | D | D | F | F | U |
| 50 | D | D | F | F | U | U | U | D | D | F | F | U | U | U |
| 51 | D | F | F | U | U | U | U | D | F | F | U | U | U | U |
| 52 | D | F | F | F | F | F | U | D | F | F | F | F | F | U |
| 53 | D | D | F | F | F | F | U | D | D | F | F | F | F | U |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

In Table 3, D denotes a downlink symbol, U denotes an uplink symbol, and F denotes a flexible symbol. As shown in Table 3, DL/UL switching may be allowed up to two times within a slot.

In the present specification, the terms "configuration", "setting", and "indication" may be used interchangeably. That is, the terms "configured", "set", and "indicated" may have the same meaning, and similarly, the terms "is configured", "is set", and "is indicated" may have the same meaning.

FIG. 12 to 18 illustrate a subband configuration method according to an embodiment of the present disclosure.

In a TDD or unpaired spectrum system, when a slot format is configured or indicated for a UE, problems such as uplink coverage reduction, increased latency, and decreased capacity may arise if a limited time domain resource is allocated as an uplink resource. To address these problems, a specific time domain resource within a cell may be used for both downlink reception and uplink transmission. Even when a base station uses a specific time domain resource for both downlink reception and uplink transmission, the UE may support only half-duplex communication and perform only one operation, either downlink reception or uplink transmission, in the same specific time domain resource.

The specific time domain resource may be a cell-specific flexible symbol in a semi-statically configured slot format. This is intended to minimize inter-UE interference due to transmission and reception in different symbol types (DL/UL or UL/DL).

Figure 12:
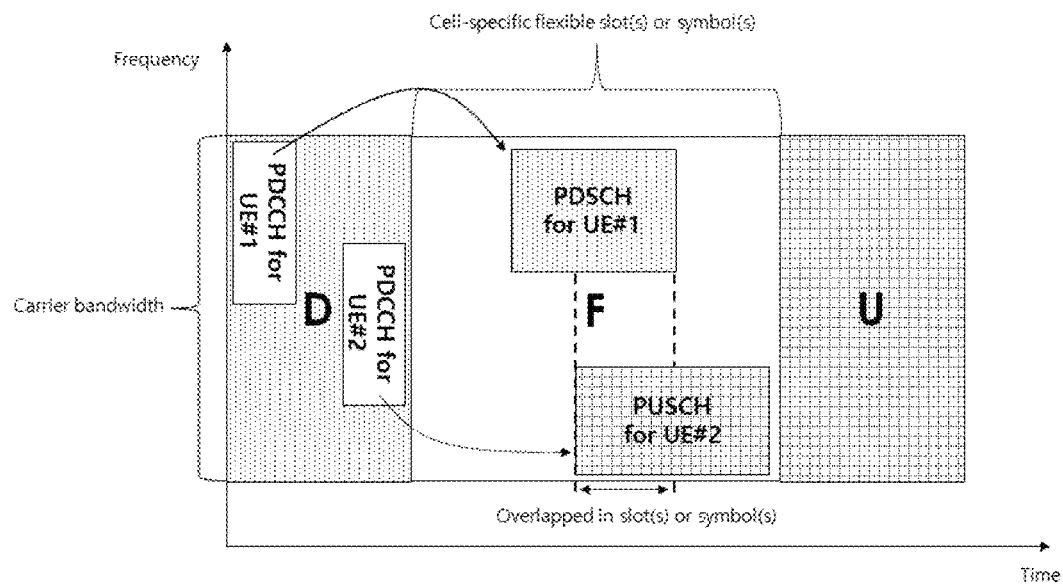
FIGS. 12 to 18 illustrate a subband configuration method.

Referring to FIG. 12, the UE may receive a cell-specific slot configuration semi-statically. The UE may perform downlink reception or uplink transmission on a resource scheduled by the base station. A resource scheduled for PDSCH reception for a first UE and a resource scheduled for PUSCH transmission for a second UE may include the same symbols in the time domain, but may be different RBs in the frequency domain. A method by which one base station schedules multiple UEs to use a specific time domain resource for both downlink reception and uplink transmission may be inefficient when considering inter-cell interference, spectrum regulation, and power consumption for PDCCH monitoring by the UE. Hereinafter, a method for addressing this inefficiency will be described. In the present specification, a subband may be configured on a frequency domain resource within a time domain resource (slot or symbol). In this case, the frequency domain resource may be included within the carrier bandwidth of the UE.

Spectrum Partitioning

A specific time domain resource (a cell-specific flexible slot/symbol) available for both downlink reception and uplink transmission may be configured for the UE by the base station in the form of multiple subbands on a frequency domain. The multiple subbands may be subbands of the same format or different formats. The subband formats may include a downlink subband, an uplink subband, and a flexible subband. The downlink subband may include one or more downlink RB(s), the uplink subband may include one or more uplink RB(s), and the flexible subband may include one or more flexible RB(s), wherein the downlink RB(s) may refer to resources available for downlink reception and the uplink RB(s) may refer to resources available for uplink transmission. The flexible RB(s) may refer to resources available for downlink reception and uplink transmission depending on the configuration by the base station.

Figure 13:
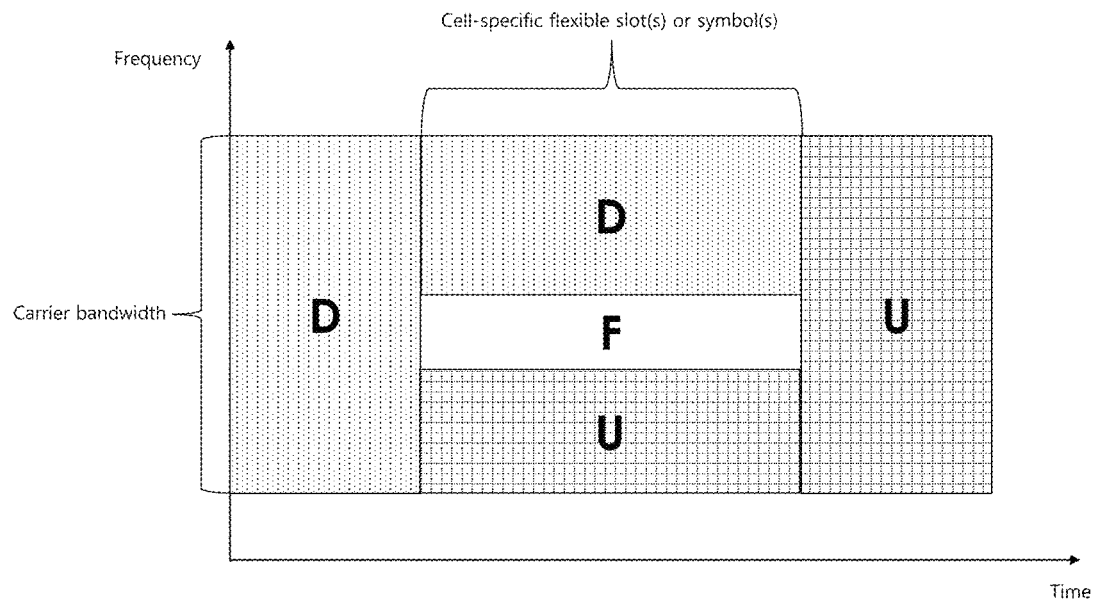

(Method 1-1) When multiple subbands are configured for a UE, there may be a maximum of one subband of the same format. That is, one cell-specific flexible slot/symbol interval may include at most one downlink subband, one uplink subband, and one flexible subband, respectively. Referring to FIG. 13, a cell-specific flexible slot/symbol may include multiple subbands. In this case, the multiple subbands may include one downlink subband, one uplink subband, and one flexible subband. A guard band may be needed to minimize the impact of UL/DL interference between the downlink subband and the uplink subband. Limiting the number of subbands of the same format to one is intended to configure a downlink subband, an uplink subband, and a flexible subband while minimizing the number of guard bands, thereby increasing the efficiency of a frequency resource during downlink reception and uplink transmission.

Figure 14:
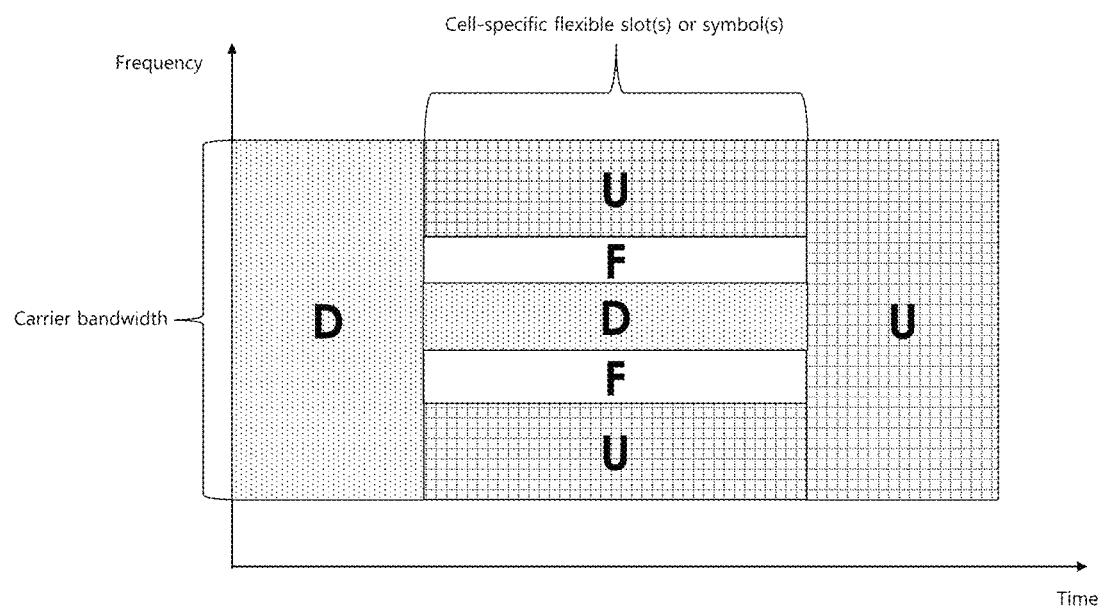

(Method 1-2) Furthermore, when multiple subbands are configured for the UE, there may be multiple subbands of the same format. That is, in one cell-specific flexible slot/symbol interval, at least one of a downlink subband, an uplink subband, and a flexible subband may be multiple subbands. Referring to FIG. 14, a cell-specific flexible slot/symbol may include multiple subbands. The multiple subbands may include one downlink subband, two uplink subbands, and two flexible subbands.

The multiple subbands in methods 1-1 and 1-2 may include non-overlapping RBs in the frequency domain.

In methods 1-1 and 1-2, the flexible subband may be configured taking into account a guard band between the uplink subband and the downlink subband. That is, there may be at least one flexible subband between the uplink subband and the downlink subband. Method 1-1 may require a smaller number of guard bands compared to Method 1-2. Therefore, there may be more resources available for downlink reception and uplink transmission. Furthermore, compared to method 1-2, method 1-1 may have more frequency resources available when a CORESET resource for PDCCH monitoring is configured for the UE, thus allowing a CORESET to be flexibly configured within one downlink subband (or flexible subband). In addition, method 1-1 may also have more frequency domain resources available for uplink transmissions than method 1-2. Thus, method 1-1 may be advantageous in terms of frequency resource utilization efficiency compared to method 1-2. Hereinafter, the methods described in the present specification are based on, but not limited to, method 1-1. In the present specification, an RB in a downlink subband may be described as a downlink RB, an RB in an uplink subband may be described as an uplink RB, and an RB in a flexible subband may be described as a flexible RB.

A method by which multiple subbands are configured in the frequency domain may be applied to a cell-specific flexible slot or symbol as well as to a cell-specific downlink slot or symbol or a cell-specific uplink slot or symbol. Thus, multiple subbands may be configured for a UE in the frequency domain for a cell-specific downlink slot or symbol and a cell-specific flexible slot or symbol. Alternatively, multiple subbands may be configured for the UE in the frequency domain for a cell-specific uplink slot or symbol and a cell-specific flexible slot or symbol.

The method by which the multiple subbands are configured in the frequency domain may be applied to a UE-specific flexible slot or symbol. Furthermore, the method by which the multiple subbands are configured in the frequency domain may be applied to a UE-specific downlink slot or symbol.

Semi-Static Subband Format Configuration

A subband may be semi-statically configured for the UE through a cell-specific RRC signal or SIB. The UE may configure the subband by semi-statically receiving subband configuration information from the base station. The subband configuration information may include information related to the position of the subband and information related to the type of subband (the type of RB).

Figure 15:
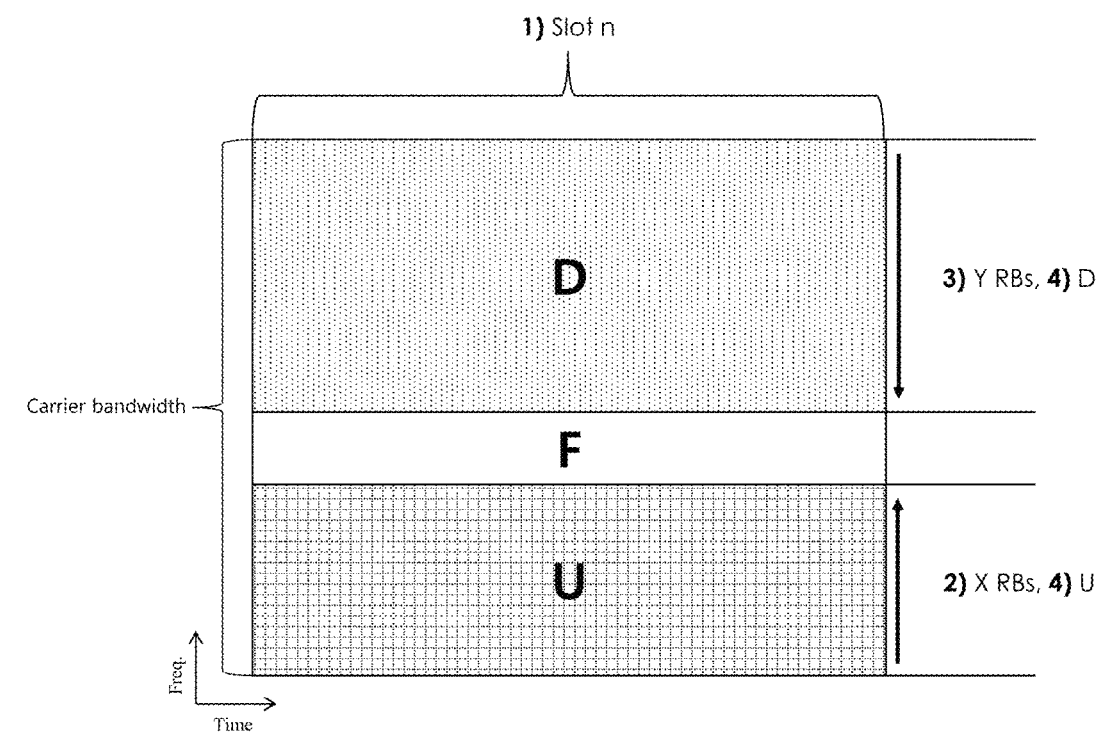

(Method 2-1) The UE may receive subband configuration information from the base station to configure the number of downlink RBs and the number of uplink RBs. The subband configuration information may include at least one among an index of one of slots in a period, the number of uplink RBs starting from the first RB in a slot corresponding to the index, the number of downlink RBs, the number of downlink RBs starting from the last RB in the slot corresponding to the index, the number of uplink RBs, and information about positions of a downlink subband and an uplink subband. Among the RBs in the slot, an RB that is not configured as a downlink RB or an uplink RB may be determined to be a flexible RB. Referring to FIG. 15, 1) the index for a slot is n, 2) X RBs starting from the first RB in slot n are uplink RBs, and 3) Y RBs starting from the last RB in slot n are downlink RBs. 4) A subband including X RBs starting from the first RB in slot n may be an uplink subband, and a subband including Y RBs starting from the last RB in slot n may be a downlink subband. Alternatively, in contrast to FIG. 15, the subband including X RBs starting from the first RB in slot n may be configured as a downlink subband and the subband including Y RBs starting from the last RB in slot n may be configured as an uplink subband.

Figure 16:
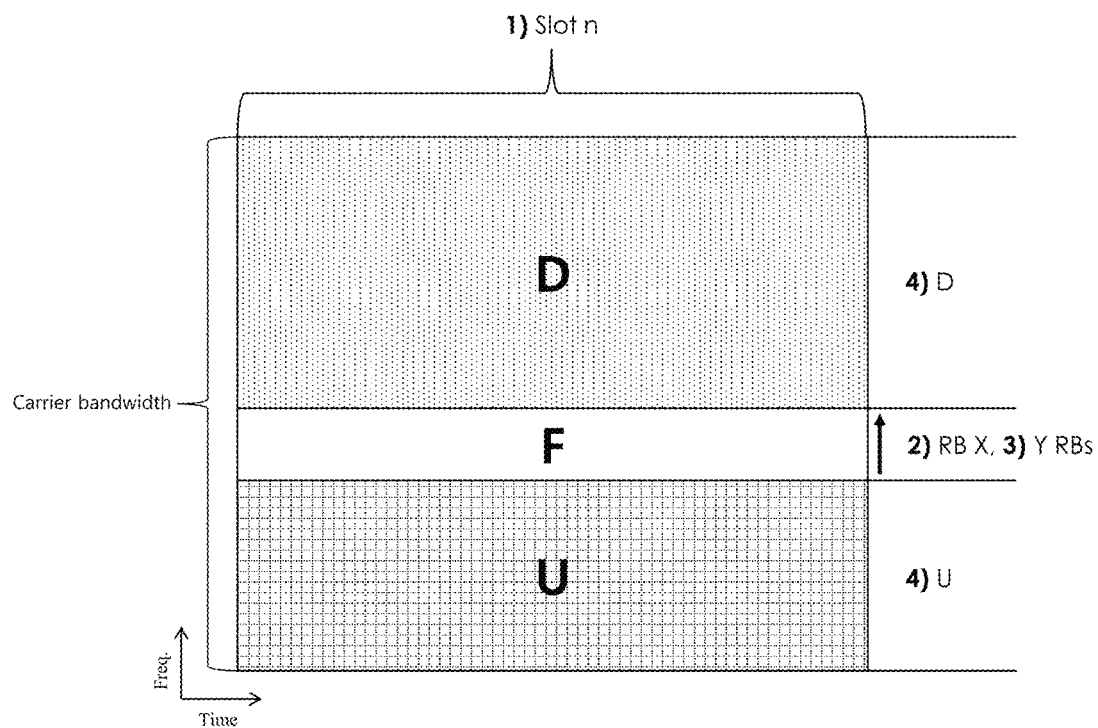

(Method 2-2) The UE may receive subband configuration information from the base station to configure the number of flexible RBs and a starting RB. The subband configuration information may include at least one among an index of one of the slots in a period, an index of the first flexible RB among flexible RBs in a slot corresponding to the index, the number of flexible RBs in the slot corresponding to the index, and information about positions of a downlink subband and an uplink subband. Among the RBs in the slot, RBs that are not configured as the flexible RBs may be determined to be a downlink RB and an uplink RB. Referring to FIG. 16, 1) the index for a slot is n, 2) the index of the first flexible RB in slot n is X, 3) Y RBs starting from X to are flexible subbands, and 4) subbands other than a flexible subband in slot n may be configured as a downlink subband and an uplink subband. That is, an uplink subband may include RBs from the first RB in slot n to an RB before the first flexible RB of the flexible subband, and a downlink subband may include RBs from the last RB in slot n to an RB after the last RB of the last flexible subband. Conversely, a downlink subband may include RBs from the first RB in slot n to the first flexible RB of the flexible subband, and an uplink subband may include RBs from the last RB in slot n to the last RB of the last flexible subband.

(Method 2-3) The UE may receive subband configuration information from the base station. Based on the subband configuring information, the UE may configure an uplink (or downlink) start RB, the number of uplink (or downlink) RBs, and the number of flexible RBs. Specifically, the subband configuring information may include information about one among: an index for one of slots in a period, a starting index of an uplink (or downlink) RB in a slot corresponding to the index, the number of uplink (or downlink) RBs in the slot corresponding to the index, and the number of flexible RBs in the slot corresponding to the index. The UE may determine that an RB which is not configured as an uplink (or downlink) RB or a flexible RB is a downlink (or uplink) RB.

The number of flexible RBs may not be configured by the base station. A predefined number of RBs may not be configured for a guard band, and the flexible subband may be determined by applying a pre-defined number of RBs for the guard band.

The flexible subband may be positioned between the downlink subband and the uplink subband. Therefore, there is the effect that the UE can determine the position of the flexible position even when the starting index of a flexible RB is not separately indicated.

In methods 2-1, 2-2, and 2-3, the subband configuration information may be transmitted commonly to UEs in a cell, wherein a downlink RB, an uplink RB, and a flexible RB configured for each UE may be configured in units of a common resource block (CRB) basis. In addition, in methods 2-1, 2-2, and 2-3, the subband configuration information may be transmitted to a specific UE in the cell, and a downlink RB, an uplink RB, and a flexible RB configured for each UE may be configured in units of a physical resource block (PRB).

Methods 2-1, 2-2, and 2-3 have the effect that it is possible to identify information about all subbands even when a UE partially receives subband configuration information. In methods 2-1 and 2-2, an RB in a semi-static downlink subband may be described as a semi-static downlink RB, an RB in a semi-static uplink subband may be described as a semi-static uplink RB, and an RB in a semi-static flexible subband may be described as a semi-static flexible RB.

The method of semi-statically configuring a subband based on methods 2-1, 2-2, and 2-3 may include a cell-specific flexible slot or symbol, may include a cell-specific downlink slot or symbol, and may include a cell-specific uplink slot or symbol. Thus, a subband may be semi-statically configured for the UE with respect to the cell-specific downlink slot or symbol and the cell-specific flexible slot or symbol. Alternatively, a subband may be semi-statically configured for the UE with respect to the cell-specific uplink slot or symbol and flexible slot or symbol. Alternatively, the method for semi-statically configuring a subband based on methods 2-1, 2-2, and 2-3 may include a UE-specific flexible slot or symbol. Furthermore, the method for semi-statically configuring a subband based on methods 2-1, 2-2, and 2-3 may include a UE-specific downlink slot or symbol.

The UE may use a cell-specific RRC signal or SIB or a UE-specific RRC signal to perform the method for semi-statically configuring a subband based on methods 2-1, 2-2, and 2-3.

There are multiple indexes of one of slots in a period, included in the above-described subband configuration. That is, a subband may be configured for the UE with respect to multiple slots in the period.

Dynamic Subband Format Indication

A subband format may be configured (set/indicated) for a UE through dynamic signaling. That is, the subband format may be configured for the UE from DCI transmitted via a PDCCH. When a semi-static format is not configured for the UE, the UE may consider all frequency domain resources in a slot to be semi-static flexible subbands. A subband format may be dynamically indicated to the UE through DCI. That is, a semi-static downlink subband and a semi-static uplink subband configured through the semi-static format configuration may not be indicated as a different format through DCI. When no semi-static subband format is configured for the UE, the UE may apply a subband format indicated through DCI for a cell-specific flexible slot/symbol. The subband format indicated through DCI may be described as a dynamic subband.

Sub-band RB(s) may be indicated to the UE in the frequency domain through an RIV method, which is a method for indicating consecutive scheduled resources in the frequency domain in an NR system. The RIV may be a value obtained by joint-coding a starting RB index and the number of consecutively allocated RBs. Equation 1 shows a method for determining the RIV (see 3GPP TS38.214)

if $(L_{RBs}-1) \leq \lfloor N_{BWP}^{size}/2 \rfloor$ then $RIV = N_{BWP}^{size}(L_{RBs}-1) + RB_{start}$ else $RIV = N_{BWP}^{size}(N_{BWP}^{size}-L_{RBs}+1) + (N_{BWP}^{size}-1-RB_{start})$ where $L_{RBs} \geq 1$ and shall not exceed $N_{BWP}^{size} - RB_{start}$ [Equation 1]

Here, $L_{RBs}$ may be the number of consecutively allocated RBs, $RB_{start}$ may be the starting RB index, and $N_{BWP}^{size}$ may be the BWP size of the UE. For example, when $N_{BWP}^{size}$ is 4, the expressible starting RB index and the number of consecutively allocated RBs may be as shown in Table 4.

TABLE 4

| L | S | | | |
|---|---|---|---|---|
|   | 0 | 1 | 2 | 3 |
| 1 | 0 | 1 | 2 | 3 |
| 2 | 4 | 5 | 6 |   |
| 3 | 8 | 9 |   |   |
| 4 | 7 |   |   |   |

In Table 4, S indicates the starting RB index and L is the number of consecutively allocated RBs. According to Table 4, when $N_{BWP}^{size}$ is 4, the RIV value may be one of 0 to 9. The UE may determine the starting RB index and the number of consecutively allocated RBs by the indicated RIV value. For example, when it is indicated to the UE that an RIV value is 5, the UE may identify that two consecutive RBs have been allocated starting from RB #1 in the frequency domain.

The following describes a method by which, for a UE, a subband format in the frequency domain is indicated by the base station in an RIV form through DCI.

(Method 3-1) The number of downlink RBs and the number of uplink RBs as subband configuration information may be indicated to a UE by a base station. The number of downlink and uplink RBs may be indicated as one joint-coded value to the UE. When the one value is obtained in an RIV form, the one value may be determined through Equation 2.

if $L_{RBs}^2 \leq \lfloor N_F^{size}/2 \rfloor$ then $RIV = (N_F^{size}+1)L_{RBs}^2 + L_{RBs}^1$ else $RIV = (N_F^{size}+1)(N_F^{size}+1-L_{RBs}^2) + (N_F^{size}-L_{RBs}^1)$ where $L_{RBs}^1 \geq 0$, $L_{RBs}^2 \geq 0$, and $L_{RBs}^1 + L_{RBs}^2$ shall not exceed $N_F^{size}$. [Equation 2]

Here, $L_{RBs}^1$ may indicate the number of consecutively allocated first RBs, and $L_{RBs}^2$ may indicate the number of consecutively allocated second RBs. When a subband format is semi-statically configured for the UE, $N_F^{size}$ may be the size of a flexible subband in the semi-statically configured subband format. When a subband format is not semi-statically configured for the UE, $N_F^{size}$ may be the size of the entire carrier bandwidth. For example, when $N_F^{size}$ is 4, the number of two consecutively allocated RBs may be as shown in Table 5.

TABLE 5

| L2 | L1 | | | | |
|----|----|----|----|----|----|
|    | 0  | 1  | 2  | 3  | 4  |
| 0  | 0  | 1  | 2  | 3  | 4  |
| 1  | 5  | 6  | 7  | 8  |    |
| 2  | 10 | 11 | 12 |    |    |
| 3  | 14 | 13 |    |    |    |
| 4  | 9  |    |    |    |    |

In Table 5, L1 may be the number of consecutively allocated first RBs and L2 may be the number of consecutively allocated second RBs. According to Table 5, when $N_F^{size}$ is 4, the RIV value may be any one value among 0 to 14. The UE may determine the number of consecutively allocated RBs in downlink and uplink subbands by the indicated RIV value. That is, the UE may determine L1 as the number of consecutively allocated RBs in the uplink subband and L2 as the number of consecutively allocated RBs in the downlink subband. Conversely, the UE may determine L1 as the number of consecutively allocated RBs in the downlink subband and L2 as the number of consecutively allocated RBs in the uplink subband.

Figure 17:
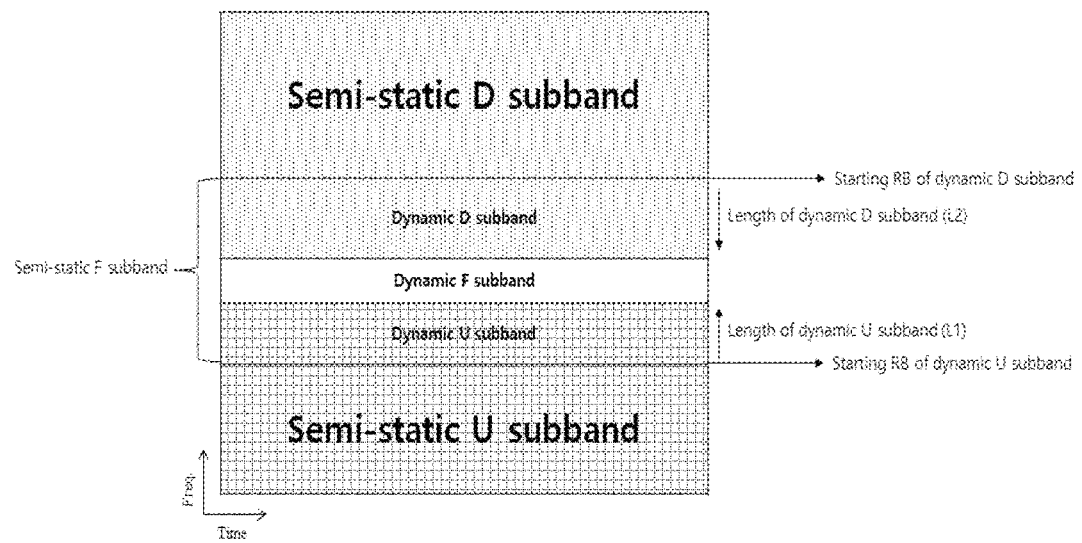

When the UE determines L1 and L2 as the number of RBs consecutively allocated to the uplink (or downlink) subband and the downlink (or uplink) subband, respectively, the UE may implicitly determine the starting RB index of each subband based on the semi-statically configured subband format. Specifically, when L1 and L2 indicated for a semi-static flexible subband are applied according to method 3-1, the starting RB of the downlink subband may be determined to be an RB before or after a semi-statically configured cell-specific downlink subband, and the starting RB of the uplink subband may be determined to be an RB after or before a semi-statically configured cell-specific uplink subband. Furthermore, in the semi-static flexible subband, RB(s) that are not determined to be a dynamic downlink subband and a dynamic uplink subband may be determined to be a dynamic flexible subband. Referring to FIG. 17, it may be indicated to the UE that for a semi-static flexible subband, L1 represents the number of RBs consecutively allocated to a dynamic uplink subband and L2 represents the number of RBs consecutively allocated to a dynamic downlink subband. Furthermore, in the semi-static subband configuration, a semi-static uplink subband may include RBs from the first RB in slot n to an RB before the first dynamic subband RB (a dynamic uplink (or downlink) subband RB), and a semi-static downlink subband may include RBs from the last RB in slot n to an RB after the dynamic subband RB (the dynamic uplink (or downlink) subband RB). Thus, the UE may determine that L1 RBs starting from an RB after the semi-statically configured uplink subband are the dynamic uplink subband, and that the L2 RBs starting from an RB before the semi-static downlink subband are the dynamic downlink subband. The UE may determine that RBs in the semi-static flexible subband, which are not dynamically indicated as a downlink subband or an uplink subband, are a dynamic flexible subband.

Figure 18:
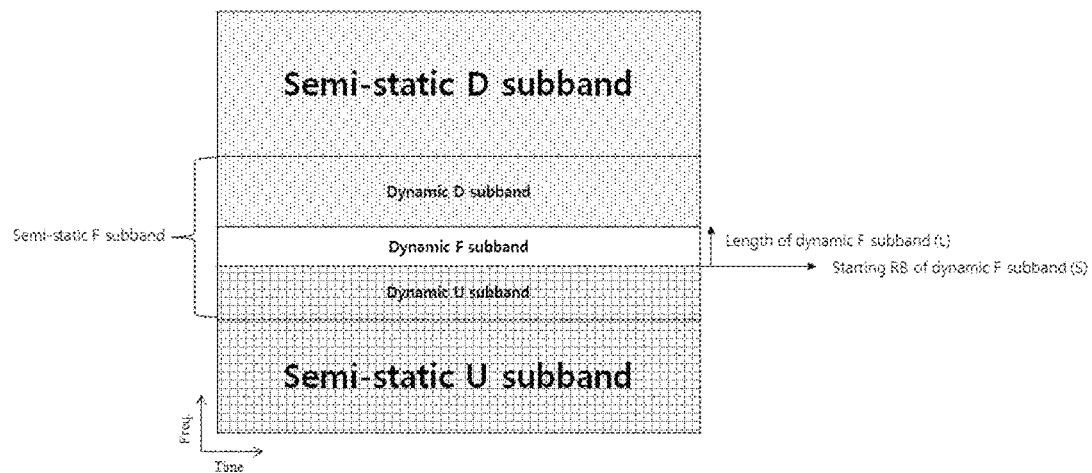

(Method 3-2) An index of a starting RB of a flexible subband and the number of RBs as subband configuration information may be indicated to a UE. The index of the starting RB of the flexible subband and the number of RBs may be indicated as one joint-coded value for the UE. When the one value is determined in an RIV form, the one value may be obtained through Equation 1. In this case, $N_F^{size}$ is used instead of $N_{BWP}^{size}$ in Equation 1, and $N_F^{size}$ is the same as defined in Equation 2. Furthermore, an RB that is not determined as a dynamic flexible subband may be determined as a dynamic downlink subband and a dynamic uplink subband. In this case, the dynamic downlink subband and the dynamic uplink subband may include RBs consecutive to a semi-static downlink subband and a semi-static uplink subband, which are semi-statically configured, in the frequency domain. Referring to FIG. 18, a dynamic flexible subband may be positioned within a semi-static flexible subband. S may be an index of a starting RB of the dynamic flexible subband, and L may be the number of RBs consecutively allocated to the dynamic flexible subband. The UE may determine the dynamic flexible subband based on the index of the starting RB and the number of consecutive RBs, configured for the semi-static flexible subband. The UE may determine that RBs of the semi-static flexible subband, which are not configured as the dynamic flexible subband, are RBs of the dynamic downlink subband and the dynamic uplink subband. The UE may determine that RBs, which are consecutive to the semi-static downlink subband, among the RBs that are not configured for the configuration of the dynamic flexible subband, are RBs of the dynamic downlink subband. The UE may determine that RBs, which are consecutive to the semi-static uplink subband, among RBs not indicated as the dynamic flexible subband, are RBs of the dynamic uplink subband.

The unit of RB in methods 3-1 and 3-2 may be a PRB.

(Method 3-3) A base station may indicate, to a UE, an index of a starting RB in an uplink (or downlink) subband and the number of RBs. One value, in which the index of the starting RB and the number of RBs are joint-coded, may be indicated for the UE by the base station. In this case, the one joint-coded value may be obtained through Equation 1 above. The UE may determine that RBs, which are not indicated as uplink (or downlink) RBs, are downlink (or uplink) RBs or flexible RBs. Furthermore, the number of flexible RBs may be the number of flexible RBs that are semi-statically configured or determined by the UE. The UE may determine that an RB, which is not an uplink (or downlink) RB or a flexible RB, is a downlink (or uplink) RB.

The flexible subband may be positioned between the downlink subband and the uplink subband. Therefore, the UE may identify the position of the flexible subband without ambiguity, even when a starting index of a flexible RB is not separately indicated.

In methods 3-1, 3-2, and 3-3, the dynamic downlink subband, the dynamic uplink subband, and the dynamic flexible subband may include consecutive RBs in the frequency domain.

In methods 3-1, 3-2, and 3-3, the subband configuration information may be transmitted commonly to UEs in a cell, wherein a downlink RB, an uplink RB, and a flexible RB configured for each UE may be configured in units of common resource blocks (CRBs).

When a dynamic subband format is indicated to a UE according to method 3-1, 3-2, or 3-3, information about the subband format may be transmitted to the UE through group-common signaling. For example, the dynamic subband format information may be included in DCI format 2_0 used in legacy NR. DCI format 2_0 may be transmitted through GC-PDCCH, and the GC-PDCCH may be CRC-scrambled with SFI-RNTI for UEs receiving the subband format information. The UE may perform blind decoding at each monitoring period configured by the base station to receive the GC-PDCCH including the DCI format 2_0 including the subband format information. When the UE successfully receives GC-PDCCH by performing blind decoding, the UE may apply the subband format information during the monitoring period configured by the base station starting from a slot in which the PDCCH has been received. In addition, the dynamic subband format information may be transmitted through a new DCI format (e.g., DCI format 2_x) rather than the DCI format used in legacy NR. DCI format 2_x may be transmitted through a GC-PDCCH, and the GC-PDCCH may transmit a slot formation indication in frequency domain (SFI-F) to notify UEs, which receive the subband format information, of a slot format in the frequency domain. SFI-F may be CRC-scrambled with SFIF-RNTI. To receive the PDCCH including DCI format 2_x, blind decoding may be performed at each monitoring period configured by the base station. When the UE successfully receives the GC-PDCCH by performing blind decoding, the UE may apply the subband format information during the monitoring period configured by the base station starting from a slot in which the GC-PDCCH has been received.

When a dynamic subband format is configured for a UE according to method 3-1, the payload size of DCI format 2_0 or DCI format 2_x including dynamic subband format information may be $\lceil \log_2((N_F^{size}+1)(N_F^{size}+2)/2) \rceil$ bits. When a dynamic subband format is configured for a UE according to method 3-2, the payload size of DCI format 2_0 or DCI format 2_x including dynamic subband format information may be $\lceil \log_2(N_F^{size}(N_F^{size}+1)/2) \rceil$ bits. When a dynamic subband format is configured for a UE according to method 3-3, the payload size of DCI format 2_0 or DCI format 2_x including dynamic subband format information may be $\lceil \log_2(N_{BWP}^{size}(N_{BWP}^{size}+1)/2) \rceil$ bits.

An RB in the dynamic downlink subband determined according to method 3-1, 3-2, or 3-3 may be described as a dynamic downlink RB, an RB in the dynamic uplink subband may be described as a dynamic uplink RB, and an RB in the dynamic flexible subband may be described as a dynamic flexible RB.

The method for dynamically indicating a subband based on method 3-1, 3-2, or 3-3 may be applied to a cell-specific flexible slot or symbol, and may be applied to a cell-specific downlink slot or symbols or uplink slot or symbol. Thus, for a cell-specific downlink slot or symbol and a cell-specific flexible slot or symbol, a subband may be dynamically indicated to a UE. In addition, for a cell-specific uplink slot or symbol, a subband may be dynamically indicated to the UE.

The method for dynamically configuring a subband for a UE based on method 3-1, 3-2, or 3-3 may be applied to a UE-specific flexible slot or symbol. In addition, the method for dynamically configured a subband for a UE, based on method 3-1, 3-2, or 3-3, may be applied to a UE-specific downlink slot or symbol.

Uplink Transmission

A method in which a UE transmits a physical uplink shared channel (PUSCH) will be described. The UE may transmit uplink data (e.g., UL-SCH TB) to a base station through the PUSCH. At this time, the UE may transmit uplink data by using a method of scheduling PUSCH obtained from DCI in PDCCH (DG, dynamic grant) or a method of transmitting PUSCH according to a transmission method and a resource preconfigured by the base station (CG, configured grant).

The DCI that the UE may identify by decoding the PDCCH may include PUSCH scheduling information. The PUSCH scheduling information may include time-domain information (hereinafter referred to as time-domain resource assignment, TDRA) and frequency-domain information (hereinafter referred to as frequency-domain resource assignment, FDRA). The UE may interpret the DCI transmitted via the PDCCH, based on information on the control resource set (CORESET) and the search space, and perform an operation indicated in the DCI. The DCI format for scheduling the PUSCH may be one of DCI format 0_0, 0_1, or 0_2.

The time-domain information of PUSCH indicated in the TDRA field in DCI format 0_0, 0_1, or 0_2 includes the following:

K2: An offset value between (i) a slot in which the UE receives a PDCCH from a base station and (ii) a slot in which the UE transmits a PUSCH to the base station.

Starting and length indication value (SLIV): A joint-coded value of a starting symbol index (S) of PUSCH and a symbol length (L) of PUSCH within a slot indicated by the K2 value. The UE may be configured by the base station with K2 and SLIV. Alternatively, the UE may be configured by the base station with K2, S, and L.

When the UE receives, in slot n, DCI (e.g., DCI format 0_0, 0_1, or 0_2) for scheduling a PUSCH, slot floor $(n*2^{\mu PUSCH}/n*2^{\mu PDCCH})+K2$ is determined as a slot in which the PUSCH is transmitted. Here, μPUSCH and μPDCCH represent the SCS of the cell (or BWP) in which the PUSCH is scheduled and the cell (or BWP) in which the PDCCH is received, respectively.

PUSCH may be configured as either PUSCH mapping Type A or PUSCH mapping Type B. When the UE is configured to use PUSCH mapping Type A, the UE may only receive PUSCH resource allocation including a DMRS symbol, and the DMRS symbol is located in the third or fourth symbol of the slot indicated by the K2 value according to the value configured by the base station. That is, when the UE is configured to use PUSCH mapping Type A, the start symbol index (S) of the PUSCH may be configured/indicated as 0, the symbol length (L) of the PUSCH may be configured/indicated as one of the values from 4 to 14 (12 in case of extended CP), or SLIV may be configured/indicated as one of the values from 4 to 14 (12 in case of extended CP). When the UE is configured to use PUSCH mapping Type B, the first symbol of the PUSCH may be at least a DMRS symbol, the start symbol index of the PUSCH may be configured as one of the values from 0 to 13 (11 for extended CP), and the symbol length of the PUSCH may be configured as one of the values from 1 to 14 (12 for extended CP). Alternatively, when the UE is configured to use PUSCH mapping Type B and PUSCH repetition Type A, SLIV may be configured as one of the values from 1 to 14 (12 for extended CP). When the UE is configured to use PUSCH mapping Type B and PUSCH repetition Type B, SLIV may be configured as one of the values from 1 to 27 (23 for extended CP).

The frequency-domain information of PUSCH indicated in the FDRA field in DCI format 0_0, 0_1, or 0_2 may be categorized into two types according to the uplink resource allocation type.

In case of uplink resource allocation type 0, a fixed number of PRBs according to the number of PRBs included in the BWP configured for the UE are grouped into a resource block group (RBG), and the UE is instructed with an RBG-unit bitmap and thus determines whether to use the corresponding RBG. The number of PRBs included in one RBG may be configured by the base station. The more PRBs included in the BWP configured for the UE, the more PRBs may be configured to be included in one RBG. The UE determines/interprets that PUSCH is not scheduled for any PRB among the PRBs in the corresponding RBG when the bit value indicated in the bitmap is 0, and determines/interprets that PUSCH is scheduled for all PRBs in the corresponding RBG when the bit value is 1. Alternatively, the bit values may be applied in reverse according to an implementation method.

In case of uplink resource allocation type 1, resource allocation information may indicate information of consecutive PRBs allocated for uplink transmission. The resource allocation information includes a resource indication value (RIV) obtained by jointly coding the start index and length of consecutive PRBs in the frequency domain. The RIV may be defined to indicate the start index and length of consecutive PRBs, based on the size of the initial BWP or the active BWP of the UE.

Limited to DCI format 0_1 or 0_2, the UE may be configured by the base station to use only one of the two uplink resource allocation types, or to dynamically use both types. When the UE is configured to dynamically use both uplink resource allocation types, the UE may determine the uplink resource allocation type to be used for PUSCH transmission via 1 bit of the most significant bit (MSB) of the FDRA field in DCI format 0_1 or 0_2.

The NR system supports configured grant (CG)-based PUSCH (hereinafter, CG-PUSCH) transmission scheme to support uplink URLLC transmission, etc. The CG-PUSCH transmission scheme is also called grant-free transmission scheme. The CG-PUSCH transmission scheme is a scheme in which a UE receives resources usable for PUSCH transmission from a base station in advance via an upper layer (e.g., RRC) signal and transmits PUSCH via the corresponding resources. The CG-PUSCH transmission scheme may be categorized into the following two types according to whether activation or release is possible via DCI.

Type 1 PUSCH transmission with configured grant: The UE may be configured by the base station with a period for PUSCH transmission via a higher layer (e.g., RRC) signal, and time/frequency resources and transmission scheme may be indicated via DCI (PDCCH). The transmission scheme may include modulation and coding scheme (MCS), TB size (TBS), etc.

Type 2 PUSCH transmission with configured grant: The UE may be configured by the base station with a period for PUSCH transmission via a higher layer (e.g., RRC) signal, and the time/frequency resources and transmission scheme may be indicated via DCI (PDCCH).

The CG-PUSCH transmission scheme may support PUSCH repetition transmissions over multiple slots to ensure reliable uplink transmission. At this time, the UE and the base station define the time point that may be assumed as the start of CG-PUSCH transmission, as follows. The UE is configured to use one of the redundancy version (RV) sequences {0, 2, 3, 1}, {0, 3, 0, 3}, or {0, 0, 0, 0} for CG-PUSCH repetition transmission, and uses the RV value corresponding to the {mod(n−1, 4)+1}th value in the nth initial transmission occasion (TO). Here, n is an integer greater than 0. At this time, the UE may determine the initial TO at which repetition transmission may start according to the configured RV sequence, as follows.

In case that the RV sequence is configured to {0, 2, 3, 1}: The first TO corresponding to RV=0 may be determined as an initial TO. The UE may start the CG-PUSCH repetition transmission from the first TO corresponding to RV=0, and the base station assumes that the repetition transmission from the UE may start and attempts to receive the CG-PUSCH repetition transmission.

In case that the RV sequence is configured to {0, 3, 0, 3}: The TO corresponding to RV=0 may be determined as an initial TO. The UE may start the CG-PUSCH repetition transmission from the TO corresponding to RV=0, and the base station assumes that the repetition transmission from the UE may start and attempts to receive the CG-PUSCH repetition transmission.

In case that the RV sequence is set to {0, 0, 0, 0}: All TOs corresponding to RV=0 except the last TO may be determined as initial TOs. The UE may start CG-PUSCH repetition transmission from all TOs corresponding to RV=0 except the last TO, and the base station assumes that the UE may start repetition transmission from the UE and attempts to receive the CG-PUSCH repetition transmission.

In a wireless communication system, to enhance the reliability of PUSCH transmission and reception between a base station and a UE, the UE may be configured by the base station for PUSCH repetition transmission. The PUSCH repetition transmission that may be performed by the UE may be categorized into two types.

First, the transmission process of PUSCH repetition transmission type A of the UE is as follows. When the UE receives DCI format 0_1 to 0_2 via PDCCH for scheduling PUSCH from the base station, PUSCH repetition transmission is possible in K consecutive slots. Here, the value of K may be configured by a higher layer (e.g., RRC) or may be indicated by the value of the TDRA field of the DCI. In this case, the time/frequency resources in which the PUSCH is transmitted in each slot are the same as the time/frequency resources indicated in the DCI. That is, the PUSCH may be repeatedly transmitted in the same symbol and PRB(s) within each slot.

Next, the transmission process of PUSCH repetition transmission type B to support low-latency PUSCH repetition transmission to satisfy the requirements of URLLC, etc. is as follows. The UE may be instructed by the base station on the start symbol (S) of the PUSCH and the length (L) of the PUSCH via the TDRA field. Here, the PUSCH having the start symbol and the length indicated by the TDRA field is not an (actual) PUSCH that is transmitted, but rather a temporarily obtained PUSCH, referred to as a nominal PUSCH. In addition, the UE may be instructed on the nominal repetition number (N) of the nominal PUSCHs via the TDRA field. Therefore, the UE may determine N nominal PUSCHs via the TDRA field. The lengths of the N nominal PUSCHs are all identical, being L, and the nominal PUSCHs are continuous on the time axis without separate symbols therebetween.

The UE may determine actual PUSCH(s) from nominal PUSCHs. One nominal PUSCH may be determined as one or more actual PUSCHs. The UE may be instructed/configured by the base station on symbols unavailable in PUSCH repetition transmission type B. These are referred to as invalid symbols. The invalid symbols may include symbols configured as DL symbols via a TDD configuration, symbols configured for receiving SS/PBCH block, symbols configured for receiving CORESET associated with Type0-PDCCH CSS, and symbols configured for DL-to-UL-switching. The UE may exclude invalid symbols from nominal PUSCHs. As mentioned above, nominal PUSCHs are determined as continuous symbols, but may be determined as discontinuous symbols when invalid symbols are excluded. The actual PUSCH may be determined as continuous symbols in one nominal PUSCH from which invalid symbols are excluded. Here, when continuous symbols cross a slot boundary, the actual PUSCH can be divided based on the slot boundary.

A method in which a UE transmits a physical uplink control channel (PUCCH) will be described.

When a UE receives a DCI format (e.g., DCI format 1_0, 1_1 or 1_2) for scheduling a PUCCH, the UE should transmit the scheduled PUCCH. The PUCCH may include UCI, and the UCI may include HARQ-ACK, SR and/or CSI information. The HARQ-ACK information may be HARQ-ACK information about whether reception of two types of channels is successful. For the first type, when a PDSCH is scheduled via DCI format 1_0, 1_1 or 1_2, the HARQ-ACK information may be HARQ-ACK about whether the PDSCH reception is successful. For the second type, when DCI format 1_0, 1_1 or 1_2 indicates the release of a semi-static physical downlink shared channel (SPS PDSCH) (hereinafter, DL SPS release), HARQ-ACK information may be a HARQ-ACK about whether reception of the DCI format 1_0, 1_1 or 1_2 (or, DL SPS release) is successful.

To transmit a PUCCH for carrying HARQ-ACK, the PDSCH-to-HARQ_feedback timing indicator field included in DCI format 1_0, 1_1 or 1_2 may indicate a slot offset K1 for a slot in which a scheduled PUCCH should be transmitted. Here, the K1 value may be a non-negative integer value. The K1 value of DCI format 1_0 may indicate one of the values {0, 1, 2, 3, 4, 5, 6, 7}. The K1 value that may be indicated in DCI format 1_1 or 1_2 may be configured by a higher layer (e.g., RRC).

The UE may determine a slot for transmitting a PUCCH including the first type of HARQ-ACK information as follows. The UE may determine an uplink slot overlapping with the last symbol of a PDSCH corresponding to the HARQ-ACK information. When the index of the uplink slot is m, the uplink slot for the UE to transmit a PUCCH including HARQ-ACK information may be m+K1. Here, the index of the uplink slot is a value according to the subcarrier spacing of the (uplink) BWP in which the PUCCH is transmitted. When the UE is configured for downlink slot aggregation, the ending symbol indicates the last symbol of the PDSCH scheduled in the last slot among the slots in which the PDSCH is received.

In the NR system, to secure wide coverage, the UE may be configured to repeatedly transmit long PUCCH (PUCCH format 1, 3, 4) in 2, 4, or 8 slots. When the UE is configured to repeatedly transmit PUCCH, the same UCI may be repeatedly transmitted in each slot. The symbol configurations of PUCCHs that are repeatedly transmitted are the same. That is, the PUCCHs that are repeatedly transmitted start from the same symbol in each slot and include the same number of symbols.

When the UE performs PUCCH repetition transmission and the symbol(s) that should transmit PUCCH in a specific slot overlaps with an invalid symbol (e.g., a DL symbol that is configured semi-statically via a TDD configuration or a symbol configured for reception of an SS/PBCH block), the UE may defer the PUCCH transmission to the next slot, instead of transmitting PUCCH in the corresponding slot. Subsequently, when the symbol(s) that should transmit PUCCH in a slot where PUCCH transmission is deferred overlap with no invalid symbol, the UE may transmit the PUCCH in the corresponding slot.

Frequency Hopping of Uplink Channel

When a UE transmits a UL channel (e.g., PUSCH or PUCCH), the UE may use a frequency hopping scheme to obtain frequency diversity gain. Here, the frequency hopping scheme refers to transmitting a UL channel in PRB set #0 and transmitting the UL channel in PRB set #1. PRB set #0 and PRB set #1 are different. For convenience, in the following description, the UL channel to be transmitted in PRB set #0 will be referred to as hop 0, and the UL channel to be transmitted in PRB set #1 will be referred to as hop 1. Although the following description provides up to two hops (e.g., hop 0 and hop 1) are described, the number of hops may increase further.

When a UE transmits a PUSCH or PUCCH, a method of determining the PRB set of hop 0 (i.e., PBB set #0) and the PRB set of hop 1 (i.e., PBB set #1) is as follows.

First, frequency hopping during PUCCH transmission will be described.

Before RRC connection, in the case of PUCCH, the PRB set for frequency hopping may be determined as follows. For reference, the PUCCH before RRC connection includes a PUCCH that transmits HARQ-ACK, which is a reception success response of PDSCH (hereinafter, Msg4 PDSCH) including message 4 (Msg4) in the random access channel (RACH) process.

Before RRC connection (i.e., before UE-specific PUCCH resources are established), the UE obtains 4-bit information from system information (e.g., remaining system information (RMSI)), and the 4-bit information is used to configure/identify a cell-common PUCCH resource set.

Table 6 shows multiple cell-common PUCCH resource sets. An index corresponds to one cell-common PUCCH resource set and is indicated by the 4-bit information in the system information.

TABLE 6

| Index | PUCCH format | First symbol | Number of symbols | PRB offset $RB_{BWP}^{offset}$ | Set of initial CS indexes |
|-------|--------------|--------------|-------------------|-------------------------------|---------------------------|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0,6} |
| 8 | 1 | 4 | 10 | 0 | {0, 3, 6, 9)} |
| 9 | 1 | 4 | 10 | 2 | {0, 3, 6, 9} |
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

Thereafter, the UE may select/determine one PUCCH resource from the cell-common PUCCH resource set indicated by the system information. The one PUCCH resource may be selected/determined based on a PUCCH resource index $r_{PUCCH}$. The $r_{PUCCH}$ may be determined as follows, based on a PUCCH resource indicator (PRI) included in a DCI format (e.g., DCI format 1_0, 1_1, or 1_2) that schedules the PUCCH, and an index of a CCE in which the DCI format is received (e.g., a smallest CCE index).

$$r_{PUCCH} = \left\lfloor \frac{2 \cdot n_{CCE,0}}{N_{CCE}} \right\rfloor + 2 \cdot \Delta_{PRI} \quad \text{[Equation 3]}$$

Here, $N_{CCE}$ represents the number of CCEs in the CORESET in which the DCI format is received, $n_{CCE,0}$ represents the index of the first CCE among the CCE(s) in which the DCI format is received, and $\Delta_{PRI}$ represents the PRI value in the DCI format.

By combining the cell-common PUCCH resource set and $r_{PUCCH}$, the RB set, frequency hopping direction, initial cyclic shift (CS), etc. used for PUCCH transmission may be determined. The cell-common PUCCH resource set supports only PUCCH formats 0 and 1. In case of PUCCH formats 0 and 1, the PRB set used for PUCCH transmission consists of one PRB.

$r_{PUCCH}$ has one of the values 0, 1, . . . , 15. Therefore, the UE may perform PUCCH transmission by using the PUCCH resource corresponding to $r_{PUCCH}$ among the 16 PUCCH resources.

For example, when $r_{PUCCH}$ is one of 0, 1, . . . , 7, the PRB index of hop 0 of the PUCCH resource is $RB^{offset}_{BWP}$+ $\lfloor r_{PUCCH}/N_{CS} \rfloor$, and the PRB index of hop 1 is $N^{size}_{BWP}$−1− $RB^{offset}_{BWP}$−$\lfloor r_{PUCCH}/N_{CS} \rfloor$. When $r_{PUCCH}$ is one of 8, 9, . . . , 15, the PRB index of hop 0 of the PUCCH resource is $N^{size}_{BWP}$−1−$RB^{offset}_{BWP}$−$\lfloor (r_{PUCCH}-8)/N_{CS} \rfloor$, and the PRB index of hop 1 is $RB^{offset}_{BWP}$+$\lfloor (r_{PUCCH}-8)/N_{CS} \rfloor$.

Here, $N^{size}_{BWP}$ is the number of PRBs included in the active BWP for transmitting the PUCCH. When the PUCCH transmits the HARQ-ACK of the Msg4 PDSCH, the active BWP is the initial UL BWP. The initial UL BWP is the UL BWP used by the UE to perform cell access and is configured in SIB. $N_{CS}$ indicates the number of initial CS indices. The number of $RB^{offset}_{BWP}$ and initial CS indices is shown in Table 6.

When the index of the PRB of hop 0 is 0, the PRB indicates the lowest PRB of the active BWP of the UE. That is, the PRB index of hop 0 is interpreted as the index of the active BWP. When the PUCCH transmits the HARQ-ACK of the Msg4 PDSCH, the active BWP is replaced by the initial UL BWP. That is, the PRB index of hop 0 is interpreted as the index of the initial UL BWP.

After RRC connection, in case of PUCCH, the PRB set for frequency hopping may be determined as follows.

The index of the lowest PRB of the PRB set (i.e., PRB set #0) of hop 0 of PUCCH and the index of the lowest PRB of the PRB set (i.e., PRB set #1) of hop 1 may be configured for the UE as a PUCCH resource via an RRC signal. That is, when the UE is instructed to have one PUCCH resource (PRI in DCI), the UE may transmit hop 0 and hop 1 by using the index of the lowest PRB of the PRB set of hop 0 and the index of the lowest PRB of the PRB set of hop 1 configured in the PUCCH resource. When the index of the PRB is 0, the PRB indicates the lowest PRB of the active BWP of the UE. That is, the index of the PRB may be interpreted as the index of the active BWP of the UE.

Next, frequency hopping during PUSCH transmission will be described. In case of PUSCH, the PRB set for frequency hopping may be determined as follows. The UE may determine the PRB set (i.e., PBB set #0) of hop 0 via the DCI for scheduling the PUSCH or the DCI/RRC signal for activating the PUSCH. Here, the DCI for scheduling the PUSCH or the DCI/RRC signal for activating the PUSCH may include an FDRA field. The FDRA field may include (i) the RB index where the PRB set of hop 0 starts and (ii) the number of consecutive RBs. Here, when the RB index where the PRB set of hop 0 starts is 0, the RB represents the lowest PRB of the active BWP of the UE. That is, the RB index where the PRB set of hop 0 starts may be interpreted as the index of the active BWP of the UE. For frequency hopping, the UE should determine the RB index where the PRB set (i.e., PBB set #1) of hop 1 starts. This may be determined using Equation below.

$$RB_{start}(1) = (RB_{start}(0) + RB_{offset}) \bmod N_{BWP}^{size} \quad [\text{Equation 4}]$$

Here, $RB_{start}(0)$ represents the RB index where the PRB set of hop 0 starts, and $RB_{start}(1)$ represents the RB index where the PRB set of hop 1 starts. $RB_{offset}$ represents the PRB interval between the PRB set of hop 0 and the PRB set of hop 1. The base station may configure/instruct the UE for $RB_{offset}$, and the value of $RB^{offset}$ may be one of 0, 1, ..., $N^{size}_{BWP-1}$. $N^{size}_{BWP}$ represents the number of PRBs included in the active BWP of the UE. When the RB index where the PRB set of hop 1 obtained by Equation above starts is 0, the RB represents the lowest PRB of the active BWP of the UE. That is, the index ($RB_{start}(1)$) of the RB where the PRB set of hop 1 starts may be interpreted as the index of the active BWP of the UE.

Table 7 shows the PRB offset $RB_{offset}$ for hop 1 when PUSCH transmits Msg3 in the RACH process (hereinafter, Msg3 PUSCH). Here, $N^{size}_{BWP}$ is the number of RBs included in the initial UL BWP. According to Table 7, when the number of RBs included in the initial UL BWP is less than 50, the $RB_{offset}$ may be one of the values $\lfloor N_{BWP}^{size}/2 \rfloor$ and $\lfloor N_{BWP}^{size}/4 \rfloor$, and when the number of RBs included in the initial UL BWP is greater than or equal to 50, the $RB_{offset}$ may be one of the values $\lfloor N_{BWP}^{size}/2 \rfloor$, $\lfloor N_{BWP}^{size}/4 \rfloor$, and $-\lfloor N_{BWP}^{size}/4 \rfloor$.

TABLE 7

| Number of PRBs in initial UL BWP | Value of $N_{UL,hop}$ Hopping Bits | Frequency offset for $2^{nd}$ hop |
|---|---|---|
| $N_{BWP}^{size} < 50$ | 0 | $\lfloor N_{BWP}^{size}/2 \rfloor$ |
|  | 1 | $\lfloor N_{BWP}^{size}/4 \rfloor$ |

TABLE 7-continued

| Number of PRBs in initial UL BWP | Value of $N_{UL,hop}$ Hopping Bits | Frequency offset for $2^{nd}$ hop |
|---|---|---|
| $N_{BWP}^{size} \geq 50$ | 00 | $\lfloor N_{BWP}^{size}/2 \rfloor$ |
|  | 01 | $\lfloor N_{BWP}^{size}/4 \rfloor$ |
|  | 10 | $-\lfloor N_{BWP}^{size}/4 \rfloor$ |
|  | 11 | Reserved |

For Msg3 PUSCH initial transmission, whether to frequency hop may be indicated by a 1-bit frequency hopping flag (FH flag) in the UL grant of the random access response (RAR) that schedules Msg3 PUSCH. For Msg3 PUSCH retransmission, whether to frequency hop may be indicated by a 1-bit FH flag in the DCI format 0_0 scrambled with TC-RNTI that schedules Msg3 PUSCH. When the value of the FH flag is 0, the UE transmits the Msg3 PUSCH without frequency hopping, and when the value of the FH flag is 1, the UE transmits the Msg3 PUSCH via frequency hopping.

In the specification, Hop 0 as described above may be interchangeably referred to as a first hop, and Hop 1 as a second hop.

When a UE is configured/instructed to transmit a PUSCH or PUCCH by using a frequency hopping scheme, one of the following frequency hopping methods may be configured/instructed.

Intra-Slot Frequency Hopping:

In the case of PUSCH transmission, the UE may split the PUSCH in two halves in the time domain within the slot for which PUSCH transmission is instructed, the two halves are mapped to two hops, respectively, and are transmitted accordingly. Here, the PUSCH transmission may or may not be PUSCH repetition transmission. When the length of the symbol allocated to PUSCH in one slot is $N^{PUSCH,s}_{symb}$, floor($N^{PUSCH,s}_{symb}/2$) symbols may be mapped to PUSCH in the first hop, and $\{N^{PUSCH,s}_{symb} - \text{floor}(N^{PUSCH,s}_{symb}/2)\}$ symbols may be mapped to PUSCH in the second hop. Here, floor( ) refers to a flooring function.

In case of PUCCH transmission, the UE may split the PUCCH in two halves in the time domain within the slot for which PUSCH transmission is instructed, and the two halves are mapped to two hops, respectively, and are transmitted accordingly. Here, the PUCCH transmission may or may not be PUCCH repetition transmission. When the length of the symbol allocated to the PUCCH in one slot is number of symbols, floor (number of symbols/2) symbols may be mapped to the PUCCH in the first hop, and number of symbols−floor (number of symbols/2) symbols may be mapped to the PUCCH in the second hop.

Inter-Slot Frequency Hopping:

In case of PUSCH repetition transmission, the UE may map the PUSCH transmission to the first hop or the second hop, based on the absolute slot index within the radio frame of the slot including the PUSCH repetition transmission. Here, when the index within the radio frame of the slot including the PUSCH repetition transmission is an even number, the PUSCH transmission may be mapped to the first hop, and when the index within the radio frame of the slot including the PUSCH repetition transmission is an odd number, the PUSCH transmission may be mapped to the second hop.

In case of PUCCH repetition transmission, the UE may sequentially assign a transmission slot index, based on the first slot for which PUCCH repetition transmission (slot index for repetition) is instructed. The UE may determine, as 0, the repetition transmission slot index of the first slot for which PUCCH repetition transmission is instructed. For subsequent slots, the UE may sequentially assign a repetition transmission slot index regardless of whether PUCCH is transmitted in the corresponding slot. The UE may transmit PUCCH in the first hop in the slot corresponding to the even-numbered repetition transmission slot index, and transmit PUCCH in the second hop in the slot corresponding to the odd-numbered repetition transmission slot index.

Example: UL Frequency Hopping Supporting Subband Non-Overlapping Full Duplex (SBFD) Operation The disclosure relates to a case in which a UE is semi-statically configured or dynamically instructed for a subband format and transmits an uplink channel (e.g., PUSCH or PUCCH) by frequency hopping.

For example, the UE may be configured or instructed to use an uplink subband for flexible slot/symbol(s) or downlink slot/symbol(s). In addition, the UE may be configured or instructed to transmit a PUSCH or PUCCH by frequency hopping in the slot/symbol(s) for which the uplink subband is configured or instructed.

First, the terms used in the disclosure will be organized.

Subband non-overlapping full duplex (SBFD): Refers to a method of supporting simultaneous transmission and reception operations using a subband within a cell/BWP. Here, a subband refers to a frequency band configured/instructed for SBFD operation within a cell/BWP. One subband may be composed of one continuous (P)RB set. Examples of subband configuration/format may be referred to FIGS. 12 to 18. For example, in the case of unpaired spectrum (i.e., TDD cell/BWP), a UL subband may be configured on a DL slot/symbol, or a UL subband may be configured on a flexible slot/symbol. Alternatively, in case of unpaired spectrum, a DL subband may be configured on a UL slot/symbol, or a DL subband may be configured on a flexible slot/symbol. Additionally, in case of paired spectrum (i.e., FDD cell/BWP), a UL subband may be configured on DL BWP, or a DL subband may be configured on UL BWP. When SBFD operation is configured for a cell/BWP, the cell/BWP may include TDMed SBFD intervals and non-SBFD intervals in the time domain.

SBFD interval: refers to a time interval in which a subband is configured/instructed on a cell/BWP. For example, the SBFD interval includes a time interval in which an uplink subband is configured/instructed. For example, the SBFD interval includes a slot in which an uplink subband is configured/instructed. For example, the SBFD interval includes symbol(s) (or symbol set) in which an uplink subband is configured/instructed. The SBFD interval includes SBFD slots and/or SBFD symbol(s). The SBFD interval may include one or more subbands in the frequency domain. When multiple subbands are configured in the SBFD interval, the subbands are FDMed. Multiple subbands (DL subbands or UL subbands) in the SBFD interval may be configured to avoid overlapping each other in the frequency domain.

Non-SBFD interval: refers to a time interval in which a subband is not configured/instructed on a cell/BWP. The non-SBFD interval includes non-SBFD slots and/or non-SBFD symbols. The non-SBFD interval refers to a legacy interval or a normal interval. The non-SBFD interval includes at least one of a DL symbol, a flexible symbol, and a UL symbol according to the slot format. For example, when the SBFD operation is configured/instructed for a UL BWP, the non-SBFD interval includes a UL slot/symbol.

Determining (frequency) hop: refers to determining resources (e.g., PRB(s)) corresponding to a frequency hop.

Legacy NR system: refers to a system that operates in the legacy NR manner because the SBFD operation is not supported or configured.

For convenience, the following exemplifies a case in which the SBFD operation is configured in the UL BWP. However, the disclosure may be equally applied even when the SBFD operation is configured in a TDD cell/BWP.

1) PUSCH Case

When a UE is configured or instructed to transmit a PUSCH via frequency hopping in slots/symbols in which uplink subbands are configured, the UE may determine the first hop and the second hop in the frequency domain by using the method described above.

According to the existing method, the value configured or instructed by the base station to the UE to determine the first hop or the second hop may be applied equally not only to the slot/symbol(s) to which the subband is configured but also to other slot/symbol(s). That is, the value configured or instructed for frequency hopping is applied equally to all slots/symbols regardless of the slot/symbol type. For example, the offset value $RB_{offset}$ configured for the UE by the base station to determine the second frequency hop may be applied equally not only to the slot/symbol(s) to which the subband is configured but also to other slot/symbol(s). In other words, the offset value configured for the UE by the base station for frequency hopping may be applied equally to the slot/symbol(s) to which the subband is configured and the slot/symbol(s) to which the subband is not configured. In addition, the number of PRBs $N^{size}_{BWP}$ constituting the UL BWP may be applied equally to the slot/symbol(s) to which the subband is configured and the slot/symbol(s) to which the subband is not configured. In this case, the second hop may include PRB(s) outside the uplink subband, and when the PRB(s) are downlink PRB(s), a PUSCH may not be transmitted in the second hop.

Figure 19:
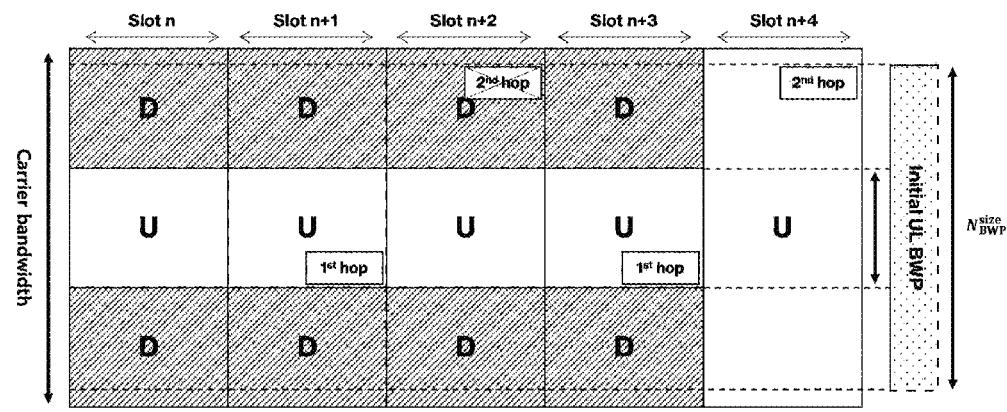
FIGS. 19 to 20 illustrate an issue occurring during frequency hopping in a resource configured or allocated for a subband.

For example, referring to FIG. 19, a UE may be commonly configured for an initial (UL) BWP for the cell and may be configured or instructed to repeatedly transmit PUSCH in (uplink) slots (slots n+1 to n+3) among the (uplink) slots (slots n to n+3) where a subband is configured, as well as in an (uplink) slot (slot n+4) where a subband is not configured. In addition, the UE may be configured or instructed to perform intra-slot frequency hopping or inter-slot frequency hopping for the PUSCH repetition transmission. In FIG. 19, it is assumed that the UE is configured or instructed to perform inter-slot frequency hopping for the PUSCH repetition transmission. According to FIG. 19, the UE may determine the first hop and the second hop by using the size of the initial (UL) BWP and the offset value ($RB_{offset}$). At this time, to maximize the frequency diversity gain in the manner used in legacy NR systems that do not consider SBFD operation, the UE may be configured with an offset value for determining a frequency hop, based on a slot (slot n+4) in which no subband is configured. In this case, the second frequency hop may be determined as a PRB(s) outside the uplink subband in the slot (slot n+2) in which the subband is configured. That is, the second hop determined based on the offset value configured with respect to slot n+4 is located in the PRB(s) outside the uplink subband in slot n+2. That is, since the second frequency hop is configured at the location of the downlink PRB(s), the UE may not transmit a PUSCH in slot n+2.

Figure 20:
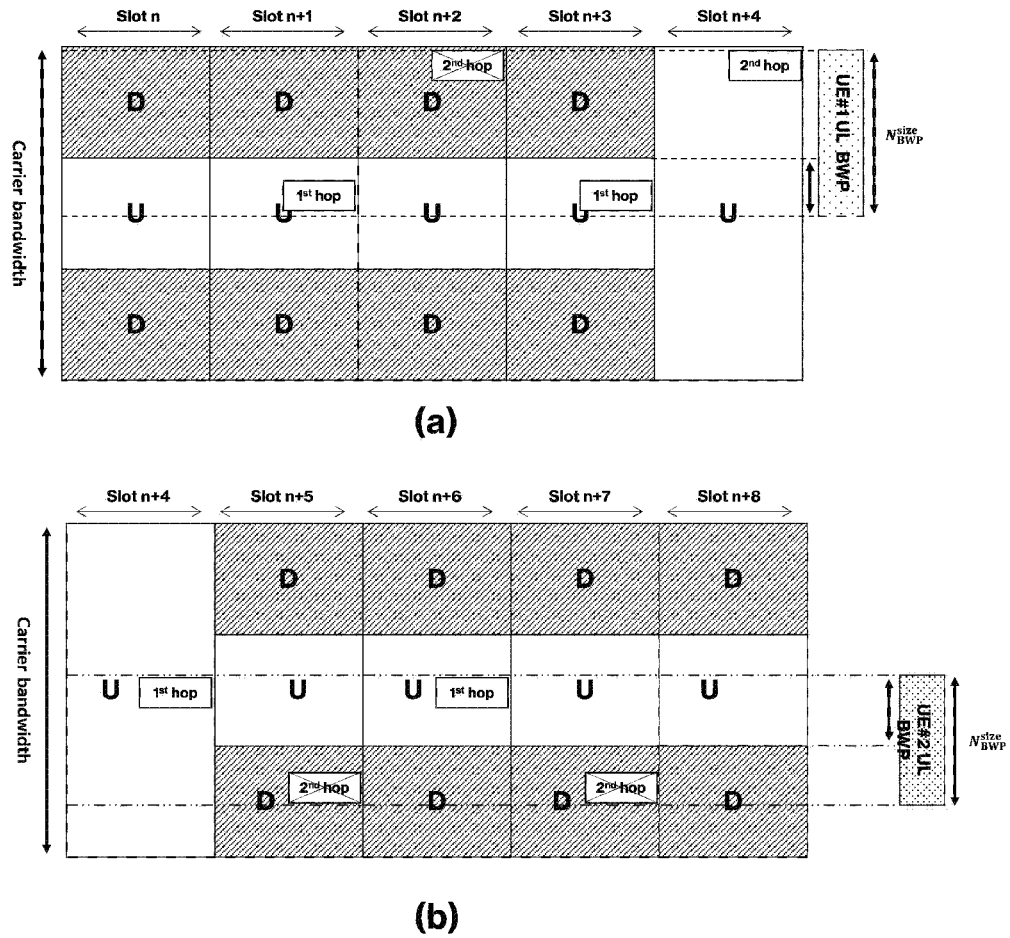

For example, referring to FIG. 20, a configured UE-specific (UL) BWP may be activated in each of UE #1 and UE #2. Referring to FIG. 20(a), UE #1 may be configured or instructed to repeatedly transmit PUSCH in (uplink) slots (slot n+1 to slot n+3) among (uplink) slots (slot n to slot n+3) for which subbands are configured and a (uplink) slot (slot n+4) for which no subband is configured. Referring to FIG. 20(b), UE #2 may be configured or instructed to repeatedly transmit PUSCH in (uplink) slots (slot n+4) for which no subbands are configured and (uplink) slots (slot n+5 to slot n+7) among (uplink) slots (slot n+5 to slot n+8) for which subbands are configured. In addition, UE #1 and UE #2 may be configured or instructed to perform intra-slot frequency hopping or inter-slot frequency hopping for PUSCH repetition transmissions. In FIG. 20, it is assumed that UE #1 and UE #2 are configured or instructed to perform inter-slot frequency hopping for PUSCH repetition transmissions. UE #1 and UE #2 may determine the first hop and the second hop, respectively, by using (i) the sizes of activated UE-specific (UL) BWPs and (ii) offset values for determining the frequency hops each configured by the base station. In this case, to maximize the frequency diversity gain in a manner used in legacy NR systems that do not consider SBFD operation, the UEs may be configured with the offset values, based on slots for which no subbands are configured (slot n+4). In this case, the second frequency hop may be determined as PRB(s) outside the uplink subband in the slots in which the subband is configured (slot n+2 of FIG. 20(a) and slot n+5 and slot n+7 of FIG. 20(b)). That is, the second hop determined based on the offset value configured with respect to slot n+4 is located in PRB(s) outside the uplink subband in slot n+2, slot n+5, and slot n+7. That is, since the second hop is configured at the location of the downlink PRB(s), the UE may not transmit the PUSCH in slot n+2, slot n+5, and slot n+7.

Hereinafter, embodiments are disclosed to solve the above problem. Specifically, embodiments are disclosed to solve the problem that the hop location is configured for a resource that is unavailable for uplink transmission when the UE is configured or instructed to transmit the PUSCH via frequency hopping in the slot/symbol(s) configured or instructed for the uplink subband, and thus the PUSCH cannot be transmitted.

Specifically, the disclosure provides a method in which the frequency hop of the PUSCH is located on an uplink transmission region or uplink slot available for transmission by the UE when frequency hopping is configured in the slot or symbol(s) for which the UE is configured or instructed to use the uplink subband. In addition, the disclosure provides a method for enabling the same frequency hop location to be configured as in a legacy NR system that does not consider the SBFD operation for (uplink) slots in which the subband is not configured/instructed.

Figure 21:
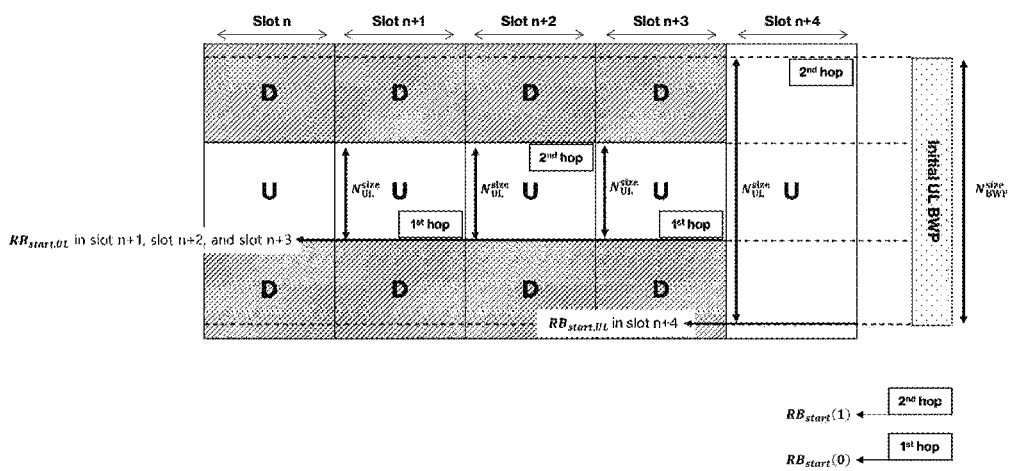

First embodiment: FIG. 21 and FIG. 22 illustrate the first embodiment.

Referring to FIG. 21, a UE may be commonly configured for an initial (UL) BWP for the cell and may be configured or instructed to repeatedly transmit PUSCH in some slots (slot n+1 to slot n+3) among SBFD slots (slot n to slot n+3) and a non-SBFD slot (slot n+4). In addition, the UE may be configured or instructed to perform inter-slot frequency hopping for the PUSCH repetition transmission. In FIG. 21, the UE may determine the first hop and the second hop by using an offset value ($RB_{offset}$) configured for the UE by the base station to determine (i) the size of the initial UL BWP and (ii) the frequency hop. According to the first embodiment, the frequency hop on which PUSCH transmission is performed may be configured/determined to be located on the uplink subband transmission region in SBFD slots (slot n+1 to slot n+3) and to have the same location as in the legacy NR system in the non-SBFD slot (slot n+4).

Referring to FIG. 22, a configured UE-specific (UL) BWP may be activated in each of UE #1 and UE #2. Referring to FIG. 22(a), UE #1 may be configured or instructed to repeatedly transmit PUSCH in some slots (slot n+1 to slot n+3) among SBFD slots (slot n to slot n+3) and a non-SBFD slot (slot n+4). According to the first embodiment, the frequency hop on which PUSCH transmission is performed may be configured/determined to be located on an uplink subband transmission region in the SBFD slots (slot n+1 to slot n+3) and to have the same location as in a legacy NR system in the non-SBFD slot (slot n+4). Referring to FIG. 22(b), UE #2 may be configured or instructed to repeatedly transmit PUSCH in some slots (slot n+5 to slot n+7) among the non-SBFD slot (slot n+4) and the SBFD slots (slot n+5 to slot n+8). In addition, UE #1 and UE #2 may be configured or instructed to perform inter-slot frequency hopping for the PUSCH repetition transmission, and determine the first hop and the second hop, respectively, by using (i) the sizes of the UE-specific UL B WPs activated in UE #1 and UE #2, respectively, and (ii) offset values for determining the frequency hops, respectively, configured by the base station. According to the first embodiment, the UE may be configured with the same frequency hop location as in the legacy NR system in the non-SBFD slot (slot n+4). Meanwhile, each frequency hop where PUSCH transmission is performed in SBFD slots (slot n+5 to slot n+7) may be configured/determined to be located on an uplink subband transmission region available for transmission by the UE.

In the first embodiment, one RB offset for frequency hopping is configured for a UE, as in the existing legacy NR system. The first embodiment provides a method in which the frequency hop where PUSCH transmission is performed is configured/determined based on the RB offset such that the frequency hop is, in SBFD slot/symbol(s), located on the uplink subband transmission region available for transmission by the UE and is, in non-SBFD slot/symbol(s), located in the same manner as in the legacy NR system. According to the first embodiment, the UE may not need to be further configured with an RB offset for frequency hopping when performing an uplink SBFD operation, and may reuse one RB offset for frequency hopping, used in an existing legacy NR system.

Specifically, the UE may determine the first PRB set of the first hop via the DCI for scheduling the PUSCH or the DCI/RRC signal for activating the CG-PUSCH. Here, the DCI for scheduling the PUSCH or the DCI/RRC signal for activating the CG-PUSCH may include an FDRA field. The FDRA field can include information about (i) an RB index where the first PRB set of the first hop starts and (ii) the number of consecutive RBs. When the RB index where the first PRB set of the first hop starts is 0, the RB represents the lowest PRB of the active UL BWP of the UE. That is, the RB index where the first PRB set of the first hop starts may be interpreted as the index of the active UL BWP of the UE. Subsequently, the UE should determine the RB index where the second PRB set of the second hop starts. This may be determined through Equation below.

$$RB_{start}(1) = M \bmod N_{UL}^{size} + RB_{start,UL} \qquad \text{[Equation 5]}$$

Here,

M represents the value obtained based on ($RB_{start}(0)$+$RB_{offset}$). For example, M contains ($RB_{start}(0)$+$RB_{offset}$−$RB_{start,UL}$).

RB(0) indicates the RB index where the first PRB set of the first hop starts, and $RB_{start}(1)$ indicates the RB index where the second PRB set of the second hop starts.

$RB_{offset}$ indicates the PRB interval between the first PRB set of the first hop and the second PRB set of the second hop. The base station may configure/instruct the UE to use $RB_{offset}$.

$RB_{start,UL}$ is the RB index of the lowest PRB available for uplink transmission in the slot or symbol(s) for transmitting PUSCH. $RB_{start,UL}$ may have different values in SBFD slot/symbol(s) and non-SBFD slot/symbol(s). For example, referring to FIG. 22(b), $RB_{start,UL}$ in slot n+4 and $RB_{start,UL}$ in slots n+5 to n+7 may be different values. For example, $RB_{start,UL}$ in SBFD slot/symbol(s) is the start PRB index (e.g., one of 0, 1, ..., $N^{size}_{BWP-1}$; preferably a positive integer) of an uplink subband on the (active UL) BWP, and $RB_{start,UL}$ in non-SBFD slot/symbol(s) may be 0.

$N^{size}_{UL}$ is the number of PRBs available for uplink transmission in the corresponding slot/symbol(s) among the PRBs of the active UL BWP. The PRBs available for uplink transmission may include PRBs that are not downlink PRBs. That is, the PRBs available for uplink transmission may include uplink or flexible PRBs. In SBFD slot/symbol(s), $N^{size}_{UL}$ may include PRB(s) included in the active UL BWP of the UE among the PRB(s) in the uplink subband. $N^{size}_{UL}$ is equal to $N^{size}_{BWP}$ in non-SBFD slot/symbol(s).

According to the first embodiment, the second PRB set of the second hop determined in the SBFD slot or symbol(s) and the non-SBFD slot or symbol(s) may include different PRB(s). Referring to FIG. 21, the second PRB set of the second hop and the second PRB set of the second hop determined by the UE in slot n+2 and slot n+4, respectively, may include different PRB(s). Referring to FIG. 22, the second PRB set of the second hop and the second PRB set of the second hop determined by UE #1 in slot n+2 and slot n+4, respectively, may include different PRB(s).

Second embodiment: In the second embodiment, as in the existing legacy NR system, the locations of frequency hops may be configured for non-SBFD slot/symbol(s) by using the first RB offset for frequency hopping for the UE in the same manner as in the legacy NR system. On the other hand, in the SBFD slot/symbol(s), the second RB offset for SBFD operation may be configured such that each frequency hop in which PUSCH transmission is performed is located on an uplink subband transmission region available for transmission by the UE. According to the second embodiment, when the UE and the base station perform the uplink SBFD operation, the second RB offset for frequency hopping for the SBFD operation needs to be further configured for the UE.

The UE may determine the first PRB set of the first hop via the DCI for scheduling the PUSCH or the DCI/RRC signal for activating the CG-PUSCH. Here, the DCI for scheduling the PUSCH or the DCI/RRC signal for activating the CG-PUSCH may include an FDRA field. The FDRA field may include (i) an RB index where the first PRB set of the first hop starts and (ii) the number of consecutive RBs. When the RB index where the first PRB set of the first hop starts is 0, the RB represents the lowest PRB of the active UL BWP of the UE. That is, the RB index where the first PRB set of the first hop starts may be interpreted as an index of the active UL BWP of the UE. Subsequently, the UE should determine the RB index where the second PRB set of the second hop starts. To this end, according to whether the slot/symbol(s) transmitting the PUSCH through frequency hopping is the slot/symbol(s) configured or instructed for an uplink subband, the RB index where the second PRB set of the second hop starts may be determined by applying the first RB offset or the second RB offset.

Specifically, for non-SBFD slots/symbols, the first RB offset (i.e., $RB_{offset}$) may be applied as in Equation below to configure the location of the same frequency hop as in the legacy NR system.

$$RB_{start}(1) = (RB_{start}(0) + RB_{offset}) \bmod N^{size}_{BWP} \quad \text{[Equation 6]}$$

Here, $RB_{start}(0)$ represents the RB index where the first PRB set of the first hop starts, and $RB_{start}(1)$ represents the RB index where the second PRB set of the second hop starts. $RB_{offset}$ represents the PRB interval between the first PRB set of the first hop and the second PRB set of the second hop. The base station may configure and instruct the UE to use $RB_{offset}$, and the value of $RB_{offset}$ may be one of 0, 1, ..., $N^{size}_{BWP-1}$. $N^{size}_{BWP}$ represents the number of PRBs included in the active UL BWP of the UE.

On the other hand, for SBFD slot/symbol(s), the second RB offset (e.g., $RB_{offset,SB}$) may be applied as in Equation below so that each frequency hop where PUSCH transmission is performed in SBFD slot/symbol(s) may be configured to be located within the uplink subband transmission region.

$$RB_{start}(1) = (RB_{start}(0) + RB_{offset,SB}) \bmod N^{size}_{BWP,SB} \quad \text{[Equation 7]}$$

Here, $RB_{start}(0)$ represents the RB index where the first PRB set of the first hop starts, and $RB_{start}(1)$ represents the RB index where the second PRB set of the second hop starts. $RB_{offset,SB}$ represents the PRB interval between the first PRB set of the first hop and the second PRB set of the second hop in SBFD slot/symbol(s). The UE may be configured by the base station for a specific BWP where the second PRB set of the second hop may be located. The specific BWP may include $N^{size}_{BWP,SB}$ PRBs. The base station may configure and instruct the UE to use $RB_{offset,SB}$, and the value of $RB_{offset,SB}$ may be one of 0, 1, ..., $N^{size}_{BWP,SB-1}$.

Third Embodiment: The third embodiment provides another method of using a first RB offset for frequency hopping for a UE as in a legacy NR system to configure the location of a frequency hop in the same manner as in a legacy NR system in non-SBFD slot/symbol(s), and configuring a second RB offset for SBFD operation such that the frequency hop is located on an uplink subband transmission region in SBFD slot/symbol(s). According to the third embodiment, when a UE and a base station perform an uplink SBFD operation, a second RB offset for frequency hopping for the SBFD operation needs to be further configured for the UE.

Specifically, the UE may determine the first PRB set of the first hop via the DCI for scheduling the PUSCH or the DCI/RRC signal for activating the CG-PUSCH. Here, the DCI for scheduling the PUSCH or the DCI/RRC signal for activating the CG-PUSCH may include an FDRA field. The FDRA field may include (i) an RB index the first PRB set of the first hop starts and (ii) the number of consecutive RBs. When the RB index where the first PRB set of the first hop starts is 0, the RB represents the lowest PRB of the active UL BWP of the UE. That is, the RB index where the first PRB set of the first hop starts may be interpreted as an index of the active UL BWP of the UE. Subsequently, the UE should determine the RB index where the second PRB set of the second hop starts.

At this time, the location of the frequency hop may be determined differently according to whether the slot/ symbol(s) transmitting the PUSCH via frequency hopping are the slot/symbol(s) configured or instructed for an uplink subband. For example, according to whether the slot/symbol(s) transmitting the PUSCH via frequency hopping are the slot/symbol(s) configure or instructed for an uplink subband, the first RB offset (Equation 9) or the second RB offset (Equation 10) may be applied to determine the RB index where the second PRB set of the second hop starts.

Specifically, in the non-SBFD interval slot/symbol(s), the location of the frequency hop may be configured in the same manner as in the legacy NR system by applying the first RB offset (i.e., $RB_{offset}$) as in Equation below.

$$RB_{start}(1) = RB_{start}(0) + RB_{offset} \quad \text{[Equation 8]}$$

Here, $RB_{start}(0)$ represents the RB index where the first PRB set of the first hop starts, and $RB_{start}(1)$ represents the RB index where the second PRB set of the second hop starts. $RB_{offset}$ represents the PRB interval between the first PRB set of the first hop and the second PRB set of the second hop. The base station may configure/instruct $RB_{offset}$ to the UE, and the value of $RB_{offset}$ may be one of a positive number, 0, or a negative number. More specifically, the value of $RB_{offset}$ may be one of −274, −273, . . . , 0, . . . , 273, 274. When the RB index where the second PRB set of the second hop obtained by Equation 9 starts is 0, the RB represents the lowest PRB of the active UL BWP of the UE. That is, the RB index where the second PRB set of the second hop starts ($RB_{start}(1)$) is interpreted as the index of the active UL BWP of the UE. When the RB index where the second PRB set of the second hop starts is negative, the RB represents a PRB of a lower frequency band than the active UL BWP of the UE. For example, when the index of the RB where the second PRB set of the second hop starts is −A, the RB represents a PRB which is A PRBs lower than the lowest PRB of the active BWP of the UE.

For SBFD slots/symbols, the second RB offset (i.e., $RB_{offset,SB}$) may be applied as in Equation below to configure such that each frequency hop where PUSCH transmission is performed in the SBFD slots/symbols is located within the uplink subband transmission region for the UE.

$$RB_{start}(1) = RB_{start}(0) + RB_{offset,SB} \quad \text{[Equation 9]}$$

Here, $RB_{start}(0)$ represents the RB index where the first PRB set of the first hop starts, and $RB_{start}(1)$ represents the RB index where the second PRB set of the second hop starts. $RB_{offset,SB}$ represents a PRB interval between the first PRB set of the first hop and the second PRB set of the second hop. The base station may configure/instruct $RB_{offset,SB}$ to the UE, and the value of $RB_{offset,SB}$ may be one of a positive number, 0, or a negative number. More specifically, the value of $RB_{offset,SB}$ may be one of −274, −273, . . . , 0, . . . , 273, 274. When the RB index where the second PRB set of the second hop starts is 0, the RB represents the lowest PRB of the active UL BWP of the UE. That is, the RB index ($RB_{start}(1)$) where the second PRB set of the second hop starts may be interpreted as the index of the active UL BWP of the UE. When the RB index where the second PRB set of the second hop starts is negative, the RB represents a PRB of a lower frequency band than the active UL BWP of the UE. For example, if the RB index where the second PRB set of the second hop starts is −A, the RB indicates a PRB which is A PRB lower than the lowest PRB of the active BWP of the UE.

The first to third embodiments may also be applied to Msg3 PUSCH. The UE may be configured or instructed to transmit PUSCH via frequency hopping in SBFD slot/symbol(s) during the initial cell access process. In this case, the first hop and the second hop may be determined in the frequency domain by the method described above. Here, since the UE is before the RRC connection, the uplink subband may be configured or instructed via information received before Msg3 PUSCH transmission. For example, the uplink subband information may be included in SIB1, and the UE may be configured or instructed to use the uplink subband by receiving SIB1.

When the first to third embodiments are applied to the Msg3 PUSCH, the PRB interval between the PRB set of the first hop and the PRB set of the second hop, i.e., $RB_{offset}$, may be determined by applying the method for obtaining the $RB_{offset}$ of the Msg3 PUSCH described above (see Table 7).

Alternatively, the $RB_{offset}$ of the Msg3 PUSCH may be determined differently from the method described above. For example, when the number of PRBs (i.e., $N^{size}_{UL}$) available for uplink transmission in the corresponding slot/symbol(s) among the PRBs of the initial UL BWP is less than 50 RBs, $RB_{offset}$ may be one of the values of $\lfloor N_{UL}^{size}/2 \rfloor$ and $\lfloor N_{UL}^{size}/4 \rfloor$, and when the number of PRBs available for uplink transmission in the corresponding slot/symbol(s) among the PRBs of the initial UL BWP is equal to or greater than 50 RBs, $RB_{offset}$ may be one of the values of $\lfloor N_{UL}^{size}/2 \rfloor$, $\lfloor N_{UL}^{size}/4 \rfloor$, and $-\lfloor N_{UL}^{size}/4 \rfloor$. This may be expressed in Table 8.

TABLE 8

| Number of PRBs in initial UL BWP | Value of $N_{UL,hop}$ Hopping Bits | Frequency offset for $2^{nd}$ hop |
|---|---|---|
| $N_{BWP}^{size} < 50$ | 0 | $\lfloor N_{UL}^{size}/2 \rfloor$ |
|  | 1 | $\lfloor N_{UL}^{size}/4 \rfloor$ |
| $N_{BWP}^{size} \geq 50$ | 00 | $\lfloor N_{UL}^{size}/2 \rfloor$ |
|  | 01 | $\lfloor N_{UL}^{size}/4 \rfloor$ |
|  | 10 | $-\lfloor N_{UL}^{size}/4 \rfloor$ |
|  | 11 | Reserved |

2) PUCCH

When a UE is configured or instructed to transmit a PUCCH via frequency hopping in SBFD slot/symbol(s), the UE may consider determining the first hop and the second hop in the frequency domain in the manner used in legacy NR systems. That is, the PUCCH resources configured for the UE by the base station to determine the first hop or the second hop may be applied equally not only to the SBFD slot/symbol(s), but also to other slot/symbol(s). In this case, the PRB(s) of the first hop and the second hop configured for the UE as PUCCH resources may include PRB(s) outside the uplink subband, and when the corresponding PRB(s) are downlink PRB(s), the UE may not transmit a PUCCH in the corresponding hop.

Hereinafter, a PUCCH frequency hopping method for solving the above-described problem will be described. For convenience, the PRB index used to determine the PRB(s) of the first hop is referred to as the first hopping PRB index, and the PRB index used to determine the PRB(s) of the second hop is referred to as the second hopping PRB index.

First embodiment: The UE may further configure an additional second hopping PRB index (hereinafter, referred to as a (2-2)th hopping PRB index) for frequency hopping among the configurations of PUCCH resources for SBFD operation, separately from the existing second hopping PRB index (hereinafter, referred to as a (2-1)th hopping PRB index) in the configuration of PUCCH resources configured in the existing legacy NR system via RRC. That is, when frequency hopping is configured for SBFD slot/symbol(s), the UE may further configure the (2-2)th hopping PRB index for SBFD operation such that a frequency hop where PUCCH transmission is performed is located on an uplink subband transmission region. The UE may be instructed by the base station via DCI to use one of the PUCCH resources. In this case, the UE may determine the location of each frequency hop where PUCCH transmission is performed, based on the hopping PRB index in the PUCCH resource. At this time, when the slot/symbol(s) where the frequency hop is located are SBFD slot/symbol(s), the UE may transmit the PUCCH by applying the (2-2)th hopping PRB index further configured for frequency hopping among the PUCCH resource configurations. On the other hand, when the slot/symbol(s) where the frequency hop is located are non-SBFD slot/symbol(s), the UE may transmit the PUCCH by applying the (2-1)th hopping PRB index. According to the first embodiment, in non-SBFD slot/symbol(s), the location of the frequency hop may be configured in the same manner as in the legacy NR system by using the (2-1)th hopping PRB index, and in SBFD slot/symbol(s), the (2-2)th hopping PRB index for SBFD operation may be used so that the frequency hop is located on the uplink subband transmission region.

As described above, the UE may be configured by the base station to use a separate second-hop PRB set for SBFD slot/symbol(s). Since the base station instructs the UE to use one of the configured PUCCH resources via DCI, the UE may be instructed such that the first PUCCH transmission at least performed in the first hop is performed in the PRB included in the uplink subband. Accordingly, the UE may be separately configured by the base station to use only the PRB set for the second hop of the PUCCH transmitted in the uplink subband. That is, the UE may be configured such that for the second-hop information for the same PUCCH resource configuration has different values for SBFD slot/symbol(s) and non-SBFD slot/symbol(s). For example, referring to FIG. 23, the UE may be configured by the base station via RRC to use a PUCCH resource with a PUCCH resource index (pucch-ResourceId) of 0 via the PUCCH-Resource. At this time, the UE may be configured with secondHopPRB=20 as the (2-1)th hopping PRB index and secondHopPRB-r18 for SBFD=10 as the (2-2)th hopping PRB index. When the second hop transmission is performed in the SBFD slot/symbol(s), the UE may determine the frequency location (e.g., PRB set) of the second hop by applying the (2-2)th hopping PRB index, i.e., secondHopPRB-r18 for SBFD=10, among the PUCCH resource configurations to transmit the PUCCH. On the other hand, when the second hop transmission is performed in the non-SBFD slot/symbol(s), the UE may determine the frequency location of the second hop by using the (2-1)th hopping PRB index, i.e., secondHopPRB=20, as in the existing legacy NR system to transmit the PUCCH.

According to the first embodiment, flexible frequency hopping is possible at least for SBFD slot/symbol(s). However, since PUCCH resources are information configured for the UE via RRC signals, applying the PUCCH resources equally to SBFD slot/symbol(s) and non-SBFD slot/symbol(s) may limit flexible PUCCH resource configuration. Hereinafter, embodiments for a flexible PUCCH resource configuration will be disclosed.

Second embodiment: The UE may be configured to use second PUCCH resources by the base station via RRC, separately from the first PUCCH resources configured in the legacy NR system via RRC, for configuring PUCCH resources for SBFD operation. For example, when PUCCH is transmitted using frequency hopping in SBFD slot/symbol(s), the second PUCCH resources for SBFD operation may be configured such that each frequency hop where PUCCH transmission is performed is located on an uplink subband transmission region. The UE may be configured to use one of the second PUCCH resources by the base station via DCI to perform transmission via the corresponding PUCCH resource. In case of non-SBFD slot/symbol(s), the UE may be configured with one of the first PUCCH resources via DCI as in the legacy NR system to perform transmission through the corresponding PUCCH resource.

As described above, the UE may be configured with separate second PUCCH resources for SBFD slot/symbol(s). That is, the UE may be configured with separate second PUCCH resources for SBFD slot/symbol(s) to receive flexible PUCCH resource configuration from the base station. The second PUCCH resources may be configured with a separate RRC signal from the PUCCH resources configured for non-SBFD slot/symbol(s). For example, referring to FIG. 24, when the UE is configured with a PUCCH resource for SBFD operation by the base station via RRC, the UE may be configured by the base station with a second PUCCH resource for PUCCH-Resource-r18 for SBFD via RRC, separately from the first PUCCH resource configured via PUCCH-Resource in the legacy NR system. Therefore, even when the PUCCH resource is configured with the same PUCCH resource index, the information configured in the corresponding PUCCH resource may be different between the first PUCCH resource and the second PUCCH resource.

In case that the UE is configured with separate second PUCCH resources by the base station according to the second embodiment, the UE may determine whether to one PUCCH resource instructed by the DCI (e.g., PRI in the DCI) among PUCCH resources from the first PUCCH resources and the second PUCCH resources, according to whether the slot/symbol(s) instructed to transmit the PUCCH in the DCI format 1_0, 1_1, or 1_2 are SBFD slot/symbol(s).

Table 9 shows an example according to the second embodiment.

TABLE 9

| PRI (3-bit) | non-SBFD slot/symbol(s) | SBFD slot/symbol(s) |
|---|---|---|
| 000 | 1st PUCCH resource among the first PUCCH resources | 1st PUCCH resource among the second PUCCH resources |
| 001 | 2nd PUCCH resource among the first PUCCH resources | 2nd PUCCH resource among the second PUCCH resources |
| 010 | 3rd PUCCH resource among the first PUCCH resources | 3rd PUCCH resource among the second PUCCH resources |
| ... | ... | ... |
| 111 | 8th PUCCH resource among the first PUCCH resources | 8th PUCCH resource among the second PUCCH resources |

In addition, the disclosure relates to a method of determining a PRB set of hop 0 (hereinafter, PBR set #0) and a PRB set of hop 1 (hereinafter, PBR set #1) when a UE transmits a PUCCH via frequency hopping in SBFD slot/symbol(s) before RRC connection during a cell initial access process.

More specifically, the disclosure relates to a method of allocating different hops, i.e., PRB sets of hop 0 and PRB sets of hop 1, within an uplink subband when a PUCCH is transmitted via frequency hopping before an RRC connection in SBFD slots/symbol(s).

When a UE transmits a PUCCH before an RRC connection, one PUCCH resource may be selected/determined among 16 PUCCH resources, based on the PRI included in the DCI format that schedules the PUCCH as described above and the index of the CCE in which the DCI format is received.

Figure 25:
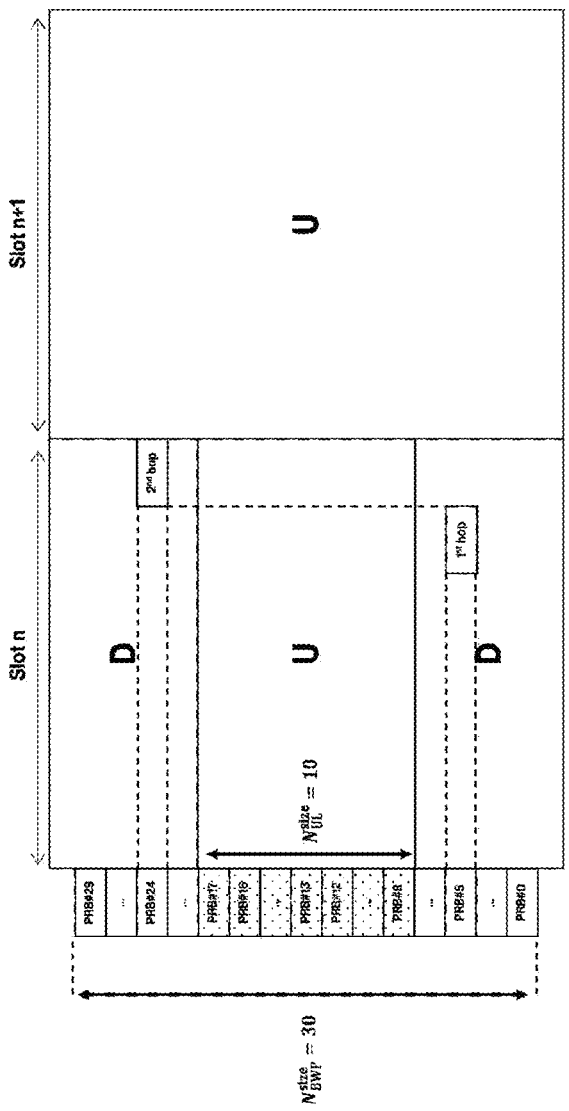

For example, referring to FIG. 25, the UE may determine the PUCCH resource index as 6, based on the PRI and CCE indices (i.e., $RB^{offset}_{BWP}=4$, $r_{PUCCH}=6$, $N_{CS}=4$). In addition, the UE may be configured or instructed to have $N^{size}_{BWP}=30$ and $N^{size}_{UL}=10$. That is, the UE may be configured or instructed to have the number of PRBs of the initial UL BWP set to 30 (PRB #0~29), and the number of PRBs available for uplink transmission in the corresponding slot/symbol(s) among the PRBs of the initial UL BWP may be configured or instructed to have 10 (PRB #8~17). At this time, when the UE determines the frequency hop by the existing method described above, the PRB index of hop 0 may be determined as $RB^{offset}_{BWP}+\lfloor r_{PUCCH}/N_{CS} \rfloor = 4+1=5$, and the PRB index of hop 1 may be determined as $N^{size}_{BWP}-1-RB^{offset}_{BWP}-\lfloor r_{PUCCH}/N_{CS} \rfloor = 30-1-4-1=24$. In this case, since the PRB of hop 0 and the PRB of hop 1 are determined as PRBs unavailable for uplink transmission in slot n, the UE may not transmit PUCCH in slot n.

Hereinafter, embodiments for solving the above problem are disclosed.

First embodiment: The UE may determine the PRB index of hop 0 as $RB_{start,UL}+RB^{offset}_{BWP}+\lfloor r_{PUCCH}/N_{CS} \rfloor$ and the PRB index of hop 1 as $N^{size}_{UL}+RB_{start,UL}-1-RB^{offset}_{BWP}-\lfloor r_{PUCCH}/N_{CS} \rfloor$. Here, $RB_{start,UL}$ represents the RB index of the lowest PRB available for uplink transmission in the slot/symbol(s) in which the uplink is configured or instructed.

Specifically, when $r_{PUCCH}$ is one of 0, 1, . . . , 7, the PRB index of hop 0 of the PUCCH resource may be determined as $RB_{start,UL}+RB^{offset}_{BWP}+\lfloor r_{PUCCH}/N_{CS} \rfloor$, and the PRB index of hop 1 may be determined as $N^{size}_{UL}+RB_{start,UL}-1-RB^{offset}_{BWP}-\lfloor r_{PUCCH}/N_{CS} \rfloor$. When $r_{PUCCH}$ is one of 8, 9, . . . , 15, the PRB index of hop 0 of the PUCCH resource may be determined as $N^{size}_{UL}+RB_{start,UL}-1-RB^{offset}_{BWP}-\lfloor (r_{PUCCH}-8)/N_{CS} \rfloor$, and the PRB index of hop 1 may be determined as $RB_{start,UL}+RB^{offset}_{BWP}+\lfloor (r_{PUCCH}-8)/N_{CS} \rfloor$.

Figure 26:
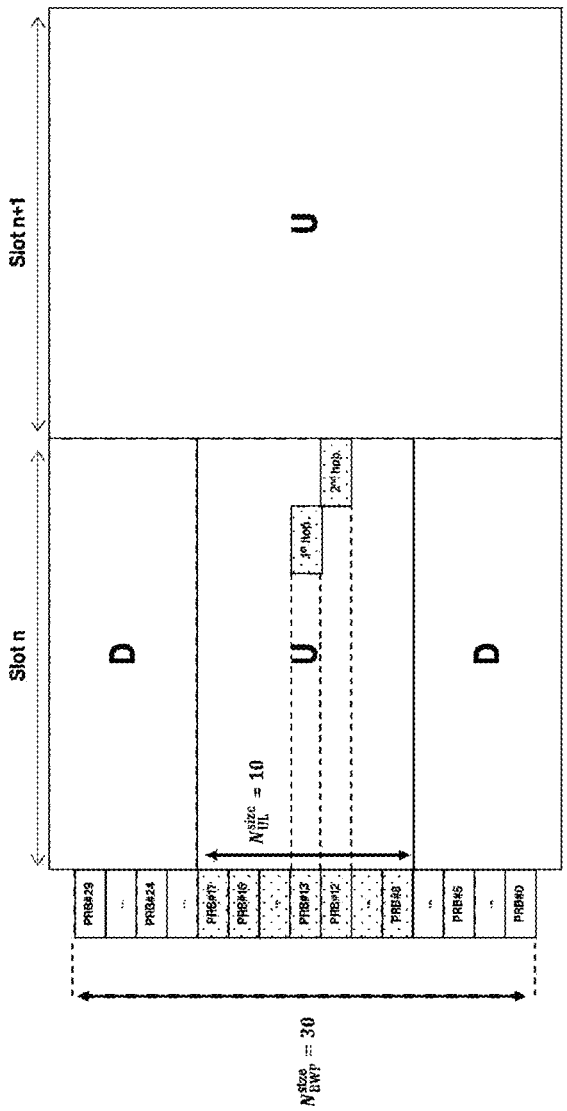
Figure 27:
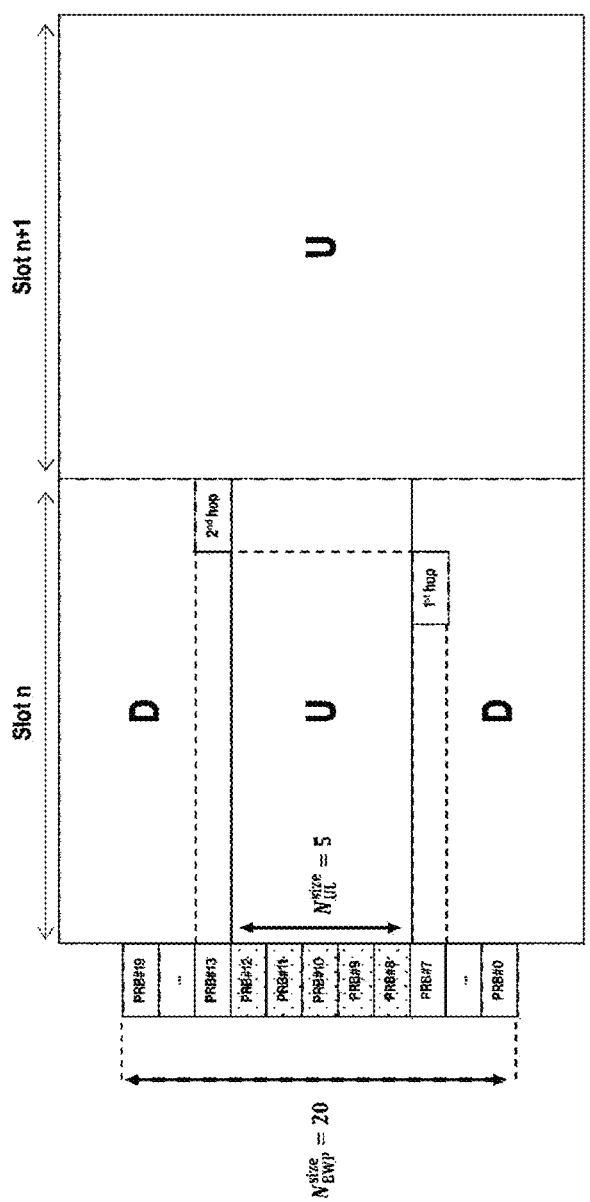

For example, referring to FIG. 26, the UE may determine the PUCCH resource index as 6, based on the PRI and CCE indices (i.e., $RB^{offset}_{BWP}=4$, $r_{PUCCH}=6$, NCS=4). In addition, the UE may be configured or instructed to have $N^{size}_{BWP}=30$, $N^{size}_{UL}=10$. According to the first embodiment, the UE may determine the PRB index of hop 0 as $RB_{start,UL}+RB^{offset}_{BWP}+\lfloor r_{PUCCH}/N_{CS} \rfloor=8+4+1=13$, and the PRB index of hop 1 as $N^{size}UL+RB_{start,UL}-1-RB^{offset}_{BWP}-\lfloor r_{PUCCH}/N_{CS} \rfloor=10+8-1-4-1=12$. The first embodiment is a method in which the UE aligns, to PRBs available for uplink transmission, the offset and size (i.e., the number of PRBs) for frequency hopping with respect to the slots/symbols for which an uplink is configured or instructed, so that the PRB of hop 0 and the PRB of hop 1 are included in the PRBs available for uplink transmission.

Figure 28:
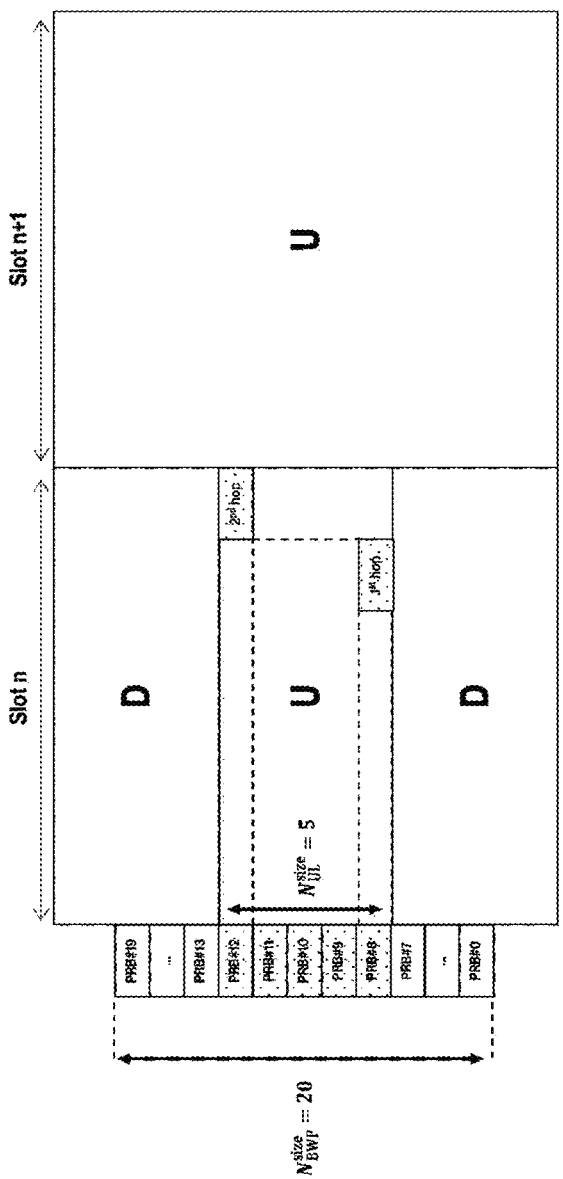

Referring to FIG. 28, a UE may be configured or instructed to use a small PRB uplink subband during the initial cell access ($N^{size}_{BWP}=20$, $N^{size}_{UL}=5$). At this time, when a PRB for frequency hopping is determined based on the PRB offset (i.e., $RB^{offset}_{BWP}$) in Table 6, the PRB index may be outside the PRB available for uplink transmission. In FIG. 28, when a PRB for frequency hopping is determined according to the first embodiment, the PRB index of hop 0 may be determined as $RB_{start,UL}+RB^{offset}_{BWP}+\lfloor r_{PUCCH}/N_{CS} \rfloor=8+4+1=13$, and the PRB index of hop 1 may be determined as $N^{size}_{UL}+RB_{start,UL}-1-RB^{offset}_{BWP}-\lfloor r_{PUCCH}/N_{CS} \rfloor=5+8-1-4-1=7$. In this case, since the PRB of hop 0 and the PRB of hop 1 are determined as PRBs unavailable for uplink transmission in slot n, the UE may not transmit PUCCH in slot n. Embodiments for solving this will be disclosed below.

Second embodiment: The UE may determine the PRB index of hop 0 as $RB_{start,UL}+(RB^{offset}_{BWP}+\lfloor r_{PUCCH}/N_{CS} \rfloor)$ mod $N^{size}_{UL}$, and the PRB index of hop 1 may be determined as $N^{size}_{UL}+RB_{start,UL}-1-(RB^{offset}_{BWP}+\lfloor r_{PUCCH}/N_{CS} \rfloor)$ mod $N^{size}_{UL}$.

Specifically, when $r_{PUCCH}$ is one of 0, 1, . . . , 7, the PRB index of hop 0 of the PUCCH resource may be determined as $RB_{start,UL}+(RB^{offset}_{BWP}+\lfloor r_{PUCCH}/N_{CS} \rfloor)$ mod $N^{size}_{UL}$, and the PRB index of hop 1 may be determined as $N^{size}_{UL}+RB_{start,UL}-1-(RB^{offset}_{BWP}+\lfloor r_{PUCCH}/N_{CS} \rfloor)$ mod $N^{size}UL$. When $r_{PUCCH}$ is one of 8, 9, . . . , 15, the PRB index of hop 0 of the PUCCH resource may be determined as $N^{size}_{UL}+RB_{start,UL}-1-(RB^{offset}_{BWP}+\lfloor (r_{PUCCH}-8)/N_{CS} \rfloor)$ mod $N^{size}_{UL}$, and the PRB index of hop 1 may be determined as $RB_{start,UL}+(RB^{offset}_{BWP}+\lfloor (r_{PUCCH}-8)/N_{CS} \rfloor)$ mod $N^{size}_{UL}$.

For example, referring to FIG. 28, the UE may determine the PUCCH resource index as 6, based on the PRI and CCE indices (i.e., $RB^{offset}_{BWP}=4$, $r_{PUCCH}=6$, NCS=4). In addition, the UE may be configured or instructed to have $N^{size}_{BWP}=20$, $N^{size}_{UL}=5$. According to the second embodiment, the UE may determine the PRB index of hop 0 as $RB_{start,UL}+(RB^{offset}_{BWP}+\lfloor r_{PUCCH}/N_{CS} \rfloor)$ mod $N^{size}_{UL}=8+(4+1)$ mod $5=8$, and the PRB index of hop 1 as $N^{size}_{UL}+RB_{start,UL}-1-(RB^{offset}_{BWP}+\lfloor r_{PUCCH}/N_{CS} \rfloor)$ mod $N^{size}_{UL}=5+8-1-(4+1)$ mod $5=12$. The second embodiment is a method in which in which the UE aligns, to PRBs available for uplink transmission, the offset and size (i.e., the number of PRBs) for frequency hopping with respect to the slots/symbols for which the UE is configured or instructed to have an uplink, so that the PRB of hop 0 and the PRB of hop 1 are included in the PRBs available for uplink transmission by and the PRB set configured for frequency hopping is always included within the uplink subband regardless of the PRB offset value ($RB^{offset}_{BWP}$) and the number of PRBs ($N^{size}_{UL}$) available for uplink transmission.

When the UE determines the PRB set for frequency hopping according to the first or second embodiment, $RB^{size}_{BWP}$ in index=15 of Table 6 may be replaced with $RB^{size}_{UL}$.

Third embodiment: The UE may determine the PRB index of hop 0 as $RB^{offset}_{UL,SB}+\lfloor r_{PUCCH}/N_{CS} \rfloor$ and the PRB index of hop 1 as $N^{size}_{BWP}-1-RB^{offset}_{UL,SB}-\lfloor r_{PUCCH}/N_{CS} \rfloor$. Here, $RB^{offset}_{UL,SB}$ is an offset separately determined by the UE for frequency hopping in the slot/symbol(s) for which the uplink is configured or instructed.

Specifically, when $r_{PUCCH}$ is one of 0, 1, . . . , 7, the PRB index of hop 0 of the PUCCH resource may be determined as $RB^{offset}_{UL,SB}+\lfloor r_{PUCCH}/N_{CS} \rfloor$, and the PRB index of hop 1 may be determined as $N^{size}_{BWP}-1-RB^{offset}_{UL,SB}-\lfloor r_{PUCCH}/N_{CS} \rfloor$. When $r_{PUCCH}$ is one of 8, 9, . . . , 15, the PRB index of hop 0 of the PUCCH resource may be determined as $N^{size}_{BWP}-1-RB^{offset}_{UL,SB}-\lfloor (r_{PUCCH}-8)/N_{CS} \rfloor$, and the PRB index of hop 1 may be determined as $RB^{offset}_{UL,SB}+\lfloor (r_{PUCCH}-8)/N_{CS} \rfloor$.

According to the third embodiment, the UE may separately determine an offset for frequency hopping in the slot/symbol(s) for which the uplink is configured or instructed. The offset may be determined based on information separately received from the base station. Alternatively, the offset may be information included in a separate Table for the UE to determine PUCCH resources before RRC connection. That is, the UE may interpret $r_{PUCCH}$ as an index applied to a new Table other than Table 6.

Figure 29:
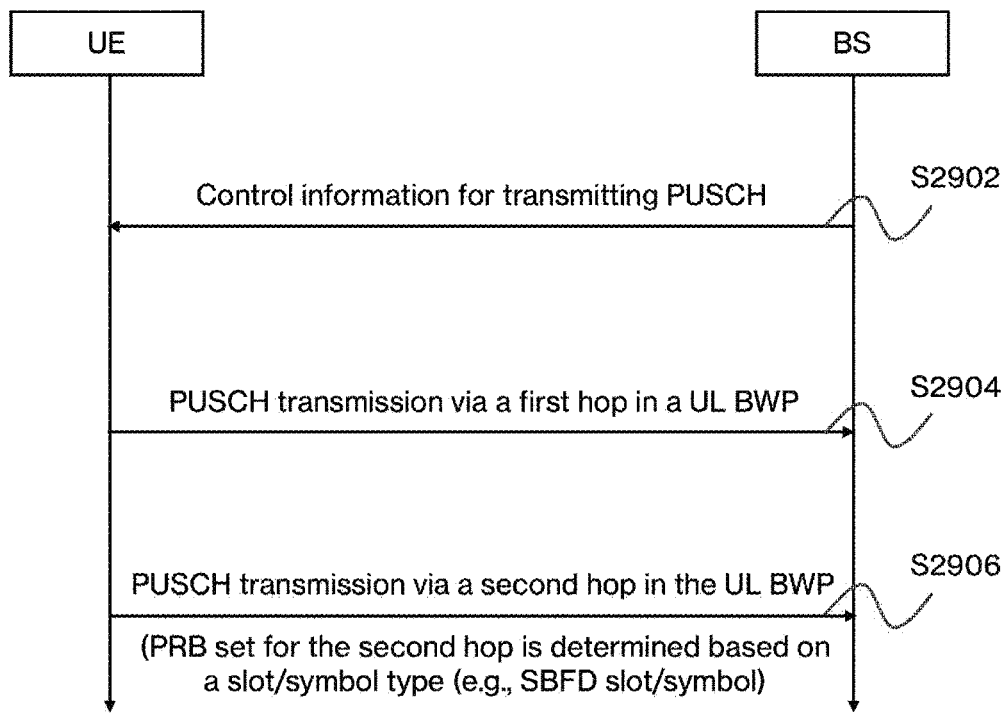

FIG. 29 illustrates a signal transmission method according to an example of the disclosure. FIG. 29 corresponds to the first embodiment of the PUSCH case. The operation in FIG. 29 may be applied to other embodiments of the PUSCH case in the same/similar manner.

Referring to FIG. 29, a UE receives control information for transmitting a PUSCH, wherein the control information may include FDRA information (S2902). Thereafter, the UE may transmit the PUSCH in a first RB set corresponding to a first hop in the UL BWP (S2904). Here, the first RB set may be determined based on the FDRA information. In addition, the UE may transmit the PUSCH in a second RB set corresponding to a second hop in the UL BWP (S2906). When the second hop belongs to an SBFD symbol set in the time domain, the second RB set may be determined based on a value satisfying Equation 1 below:

$$M \bmod N^{size}_{UL} + RB_{start,UL}, \text{ wherein} \qquad \text{Equation 1}$$

M represents a value obtained based on $(RB_{start}+RB_{offset})$, $RB_{start}$ represents a start RB index of the first RB set, $RB_{offset}$ represents an offset having a value of one of 0 to $N^{size}_{BWP}-1$, and $N^{size}_{BWP}$ represents the number of RBs of the UL BWP, $N^{size}_{UL}$ represents the number of RBs of the UL subband in the SBFD symbol set, $RB_{start,UL}$ represents an RB index having the lowest index among the RBs of the UL subband in the UL BWP in the SBFD symbol set.

When the second hop belongs to the non-SBFD symbol set in the time domain, the second RB set may be determined based on a value satisfying Equation 2 below: Equation 2: $(RB_{start}+RB_{offset}) \bmod N^{size}_{BWP}$.

Here, M may include $(RB_{start}+RB_{offset}-RB_{start,UL})$.

Here, the SBFD symbol set includes the DL subband and the UL subband that are FDMed in the frequency domain, and the RB having the lowest index in the UL subband may be located within the UL BWP.

Here, the first RB set may be determined identically based on the FDRA information, regardless of whether the first hop belongs to the SBFD symbol set or the non-SBFD symbol set in the time domain.

The method and system of the present disclosure are described in relation to specific embodiments, but configuration elements, a part of or the entirety of operations of the present disclosure may be implemented using a computer system having a general-purpose hardware architecture.

The foregoing descriptions of the present disclosure are for illustration purposes, and those skilled in the art, to which the present disclosure belongs, will be able to understand that modification to other specific forms can be easily achieved without changing the technical spirit or essential features of the present disclosure. Therefore, it should be understood that the embodiments described above are illustrative and are not restrictive in all respects. For example, each element described as one type may be implemented in a distributed manner, and similarly, elements described as being distributed may also be implemented in a combined form.

The scope of the present disclosure is indicated by claims to be described hereinafter rather than the detailed description, and all changes or modifications derived from the meaning and scope of the claims and their equivalent concepts should be interpreted as being included in the scope of the present disclosure.

The invention claimed is:

1. A user equipment (UE) used in a wireless communication system, the UE comprising:
   a communication module; and
   a processor configured to control the communication module,
   wherein the processor is configured to:
   receive control information for transmitting a physical uplink shared channel (PUSCH), the control information comprising frequency domain resource assignment (FDRA) information,
   transmit the PUSCH in a first resource block (RB) set corresponding to a first hop within an uplink (UL) bandwidth part (BWP), the first RB set being determined based on the FDRA information; and
   transmit the PUSCH in a second RB set corresponding to a second hop within the UL BWP, the second RB set being determined based on a value satisfying Equation 1 below in case that the second hop belongs to a subband non-overlapping full duplex (SBFD) symbol set in a time domain, $$M \bmod N^{size}_{UL} + RB_{start,UL}, \qquad \text{Equation 1}$$

wherein M represents a value obtained based on $(RB_{start}+RB_{offset})$, $RB_{start}$ represents a start RB index of the first RB set, $RB_{offset}$ represents an offset having a value of 0 to $N^{size}_{BWP}-1$, and $N^{size}_{BWP}$ represents the number of RBs of the UL BWP, $N^{size}_{UL}$ represents the number of RBs in a UL subband within the SBFD symbol set, and $RB_{start,UL}$ represents an index of an RB having a lowest index among RBs of the UL subband within the UL BWP in the SBFD symbol set.

2. The UE of claim 1, wherein, in case that the second hop belongs to a non-SBFD symbol set in the time domain, the second RB set is determined based on a value satisfying Equation 2 below, $$(RB_{start}+RB_{offset}) \bmod N^{size}_{BWP} \qquad \text{Equation 2.}$$

3. The UE of claim 1, wherein M comprises $(RB_{start}+RB_{offset}-RB_{start,UL})$.

4. The UE of claim 1, wherein the SBFD symbol set comprises the UL subband and a DL subband frequency-division multiplexed (FDMed) in a frequency domain, and wherein the RB having a lowest index in the UL subband is located within the UL BWP.

5. The UE of claim 1, wherein the first RB set is determined identically based on the FDRA information, regardless of whether the first hop belongs to the SBFD symbol set or the non-SBFD symbol set in the time domain.

6. A method used by a UE in a wireless communication system, the method comprising:
   receiving control information for transmitting a physical uplink shared channel (PUSCH), the control information comprising frequency domain resource assignment (FDRA) information;
   transmitting the PUSCH in a first resource block (RB) set corresponding to a first hop within an uplink (UL) bandwidth part (BWP), the first RB set being determined based on the FDRA information; and
   transmitting the PUSCH in a second RB set corresponding to a second hop within the UL BWP, the second RB set being determined based on a value satisfying Equation 1 below in case that the second hop belongs to a subband non-overlapping full duplex (SBFD) symbol set in a time domain, $$M \bmod N^{size}_{UL} + RB_{start,UL}, \qquad \text{Equation 1}$$

wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of a UL subband within the SBFD symbol set, and $RB_{start,UL}$ represents an index of an RB having a lowest index among RBs of the UL subband within the UL BWP in the SBFD symbol set.

7. The method of claim 6, wherein, in case that the second hop belongs to a non-SBFD symbol set in the time domain, the second RB set is determined based on a value satisfying Equation 2 below, $$(RB_{start}+RB_{offset}) \bmod N^{size}_{BWP}. \quad \text{Equation 2}$$

8. The method of claim 6, wherein M comprises ($RB_{start}$+$RB_{offset}$−$RB_{start,UL}$).

9. The method of claim 6, wherein the SBFD symbol set comprises the UL subband and a DL subband frequency-division multiplexed (FDMed) in a frequency domain, and
wherein the RB having a lowest index in the UL subband is located within the UL BWP.

10. The method of claim 6, wherein the first RB set is determined identically based on the FDRA information, regardless of whether the first hop belongs to the SBFD symbol set or the non-SBFD symbol set in the time domain.

11. A base station used in a wireless communication system, the base station comprising:
a communication module; and
a processor configured to control the communication module,
wherein the processor is configured to:
transmit control information for receiving a physical uplink shared channel (PUSCH), the control information comprising frequency domain resource assignment (FDRA) information;
receive the PUSCH in a first resource block (RB) set corresponding to a first hop within an uplink (UL) bandwidth part (BWP), the first RB set being determined based on the FDRA information; and
receive the PUSCH in a second RB set corresponding to a second hop within the UL BWP, the second RB set being determined based on a value satisfying Equation 1 below in case that the second hop belongs to a subband non-overlapping full duplex (SBFD) symbol set in a time domain, $$M \bmod N^{size}_{UL} + RB_{start,UL}, \quad \text{Equation 1}$$

wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of a UL subband within the SBFD symbol set, and $RB_{start,UL}$ represents an index of an RB having a lowest index among RBs of the UL subband within the UL BWP in the SBFD symbol set.

12. The base station of claim 11, wherein, in case that the second hop belongs to a non-SBFD symbol set in the time domain, the second RB set is determined based on a value satisfying Equation 2 below, $$(RB_{start}+RB_{offset}) \bmod N^{size}_{BWP}. \quad \text{Equation 2}$$

13. The base station of claim 11, wherein M comprises ($RB_{start}$+$RB_{offset}$−$RB_{start,UL}$).

14. The base station of claim 11, wherein the SBFD symbol set comprises the UL subband and a DL subband frequency-division multiplexed (FDMed) in a frequency domain, and
wherein the RB having a lowest index in the UL subband is located within the UL BWP.

15. The base station of claim 11, wherein the first RB set is determined identically based on the FDRA information, regardless of whether the first hop belongs to the SBFD symbol set or the non-SBFD symbol set in the time domain.

16. A method used by a base station in a wireless communication system, the method comprising:
transmitting control information for receiving a physical uplink shared channel (PUSCH), the control information comprising frequency domain resource assignment (FDRA) information;
receiving the PUSCH in a first resource block (RB) set corresponding to a first hop within an uplink (UL) bandwidth part (BWP), the first RB set being determined based on the FDRA information; and
receiving the PUSCH in a second RB set corresponding to a second hop within the UL BWP, the second RB set being determined based on a value satisfying Equation 1 below in case that the second hop belongs to a subband non-overlapping full duplex (SBFD) symbol set in a time domain, $$M \bmod N^{size}_{UL} + RB_{start,UL}, \quad \text{Equation 1}$$

wherein M represents a value obtained based on ($RB_{start}$+$RB_{offset}$), $RB_{start}$ represents a start RB index of the first RB set, $RB_{offset}$ represents an offset having a value of 0 to $N^{size}_{BWP}$−1, and $N^{size}_{BWP}$ represents the number of RBs of the UL BWP, $N^{size}_{UL}$ represents the number of RBs of a UL subband within the SBFD symbol set, and $RB_{start,UL}$ represents an index of an RB having a lowest index among RBs of the UL subband within the UL BWP in the SBFD symbol set.

17. The method of claim 16, wherein, in case that the second hop belongs to a non-SBFD symbol set in the time domain, the second RB set is determined based on a value satisfying Equation 2 below, $$(RB_{start}+RB_{offset}) \bmod N^{size}_{BWP}. \quad \text{Equation 2}$$

18. The method of claim 16, wherein M comprises ($RB_{start}$+$RB_{offset}$−$RB_{start,UL}$).

19. The method of claim 16, wherein the SBFD symbol set comprises the UL subband and a DL subband frequency-division multiplexed (FDMed) in a frequency domain, and
wherein the RB having a lowest index in the UL subband is located within the UL BWP.

20. The method of claim 16, wherein the first RB set is determined identically based on the FDRA information, regardless of whether the first hop belongs to the SBFD symbol set or the non-SBFD symbol set in the time domain.

* * * * *